US012762356B2

(12) United States Patent
Lee et al.

(10) Patent No.: US 12,762,356 B2
(45) Date of Patent: Oct. 13, 2026

(54) EMBEDDING TRANSFORMATION METHOD AND SYSTEM

(71) Applicant: SAMSUNG SDS CO., LTD., Seoul (KR)

(72) Inventors: Jae Young Lee, Seoul (KR); Seong Ho Joe, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 341 days.

(21) Appl. No.: 18/227,745

(22) Filed: Jul. 28, 2023

(65) Prior Publication Data

US 2024/0037347 A1 Feb. 1, 2024

(30) Foreign Application Priority Data

Jul. 29, 2022 (KR) ........................ 10-2022-0094553

(51) Int. Cl.
*G06F 40/47* (2020.01)
*G06N 20/00* (2019.01)

(52) U.S. Cl.
CPC ............. *G06F 40/47* (2020.01); *G06N 20/00* (2019.01)

(58) Field of Classification Search
CPC ........ G06F 40/47; G06F 40/242; G06F 40/40; G06F 40/58; G06N 20/00; G06N 3/044; G06N 3/0464; G06N 3/0455; G06N 3/08
USPC ............................................................. 704/2
See application file for complete search history.

(56) References Cited

U.S. PATENT DOCUMENTS

| | | | | |
|---|---|---|---|---|
| 8,615,388 | B2 | 12/2013 | Li et al. | |
| 11,321,542 | B2 | 5/2022 | Kalchbrenner et al. | |
| 2019/0340945 | A1* | 11/2019 | Malhotra | G09B 5/12 |
| 2020/0210529 | A1* | 7/2020 | Kong | G06F 40/295 |
| 2020/0372115 | A1 | 11/2020 | Liu et al. | |
| 2021/0390269 | A1* | 12/2021 | Rezagholizadeh | G06F 40/58 |
| 2022/0067307 | A1* | 3/2022 | Rei | G06N 3/084 |
| 2022/0172040 | A1* | 6/2022 | Kazi | G06N 3/08 |
| 2022/0237391 | A1* | 7/2022 | Zhang | G06F 40/284 |
| 2022/0261428 | A1* | 8/2022 | Osuala | G06N 3/045 |
| 2022/0319500 | A1* | 10/2022 | Lee | G10L 15/183 |
| 2023/0386238 | A1* | 11/2023 | Zhu | G06V 30/412 |

FOREIGN PATENT DOCUMENTS

| | | | |
|---|---|---|---|
| CN | 108563640 | A | 9/2018 |
| JP | 2022-33437 | A | 3/2022 |
| KR | 10-2105876 | B1 | 4/2020 |
| KR | 10-2021-0035721 | A | 4/2021 |
| KR | 10-2021-0156223 | A | 12/2021 |

(Continued)

OTHER PUBLICATIONS

Communication issued Aug. 19, 2026 from the Korean Patent Office in Korean Patent Application No. 10-2022-0094553.

*Primary Examiner* — Paras D Shah
*Assistant Examiner* — Fouzia Hye Solaiman
(74) *Attorney, Agent, or Firm* — Sughrue Mion, PLLC

(57) ABSTRACT

Provided is a embedding transformation method performed by at least one computing device. The method comprises obtaining a source-side embedding model, transforming source-side data into a first embedding vector through the source-side embedding model and transforming the first embedding vector into a second embedding vector located in a target-side embedding space through a transformation model.

18 Claims, 24 Drawing Sheets

(56) References Cited

FOREIGN PATENT DOCUMENTS

| | | | | | | |
|---|---|---|---|---|---|---|
| KR | 10-2357322 | B1 | | 2/2022 | | |
| KR | 10-2022-0033614 | A | | 3/2022 | | |
| KR | 10-2022-0049403 | A | | 4/2022 | | |
| KR | 10-2022-0077894 | A | | 6/2022 | | |
| TW | 201717070 | A | * | 5/2017 | ............. | G06F 40/55 |

* cited by examiner

EMBEDDING TRANSFORMATION METHOD AND SYSTEM

This application claims the benefit of Korean Patent Application No. 10-2022-0094553 filed on Jul. 29, 2022, in the Korean Intellectual Property Office, the disclosure of which is incorporated herein in its entirety by reference.

BACKGROUND

1. Field

The present disclosure relates to an embedding transformation method and system, and more particularly, to a method of efficiently performing various deep learning tasks using embedding transformation and a system for performing the method.

2. Description of the Related Art

Machine translation is a task in the field of natural language processing and is one of the tasks for which deep learning technology is showing the greatest achievements. For example, neural machine translation (NMT) models (e.g., seq2seq) based on neural networks are known to significantly outperform statistical machine translation (SMT) models in English-French or English-German translations.

However, deep learning models that perform machine translation tasks usually have a very complex structure and a fairly large scale (i.e., have a very large number of weight parameters). Therefore, they require much higher learning costs than other deep learning models (e.g., models that perform classification tasks). In addition, since the deep learning models must learn a large parallel corpus in order to outperform the SMT models, enormous time and computing costs are required to build a deep learning model with a known level of translation performance.

SUMMARY

Aspects of the present disclosure provide a method of efficiently performing various deep learning tasks (e.g., tasks related to machine translation, domain transformation, multimodal, etc.) through embedding transformation and a system for performing the method.

Aspects of the present disclosure also provide a method of accurately performing embedding transformation between a source side and a target side and a system for performing the method.

Aspects of the present disclosure also provide a method of training a deep learning model that can perform embedding transformation and a system for performing the method.

Aspects of the present disclosure also provide a method of reducing the computing cost required to train a deep learning model that can perform embedding transformation.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the inventive concept, there is provided an embedding transformation method performed by at least one computing device. The method may include obtaining a source-side embedding model, transforming source-side data into a first embedding vector through the source-side embedding model, and transforming the first embedding vector into a second embedding vector located in a target-side embedding space through a transformation model.

In some embodiments, the transformation model may include an implicit layer, and the implicit layer is configured to repeatedly perform a layer operation based on a value of a weight parameter of the implicit layer until a preset condition is satisfied.

In some embodiments, the transformation model may include an attention layer.

In some embodiments, the transformation model may be trained using the source-side embedding model and a target-side embedding model, and the source-side embedding model and the target-side embedding model are pretrained models.

In some embodiments, a training dataset for the transformation model may include source-side training data, target-side training data and target-side type information, and the type information is information for distinguishing a plurality of target-side training data corresponding to the source-side training data.

In some embodiments, the method may further include transforming target-side data into a third embedding vector through a target-side embedding model and training the transformation model based on a difference between the second embedding vector and the third embedding vector wherein the target-side data corresponds to the source-side data.

In some embodiments, the source-side embedding model and the target-side embedding model may be pretrained models, and the training of the transformation model may include updating a weight parameter of the transformation model in a state where the source-side embedding model and the target-side embedding model are frozen.

In some embodiments, the transformation model may be configured to receive the first embedding vector and the third embedding vector and output the second embedding vector.

In some embodiments, the method may further include decoding the second embedding vector through a target-side decoder and training at least one of the target-side decoder and the transformation model based on a difference between a result of the decoding and target-side data, wherein the target-side data corresponds to the source-side data.

In some embodiments, the method may further include decoding the second embedding vector through a target-side decoder, wherein the target-side decoder is trained through transforming target-side data into an embedding vector through a target-side embedding model, decoding the embedding vector through the target-side decoder, and updating a weight parameter of the target-side decoder based on a difference between a result of the decoding and the target-side data.

In some embodiments, the source-side data may be text in a source language, and the method may further include translating the text in the source language into text in a target language by decoding the second embedding vector through a target-side decoder.

In some embodiments, the source language may include a first language and a second language, and the source-side embedding model is configured to transform text in the first language and the second language into an embedding vector located in a shared embedding space.

In some embodiments, the source-side data may be data of a source modal, and the second embedding vector may be an embedding vector of data of a target modal corresponding to the data of the source modal.

In some embodiments, the source-side embedding model may include an embedding model of a first source and an embedding model of a second source, the first embedding vector is the source-side data transformed by the embedding model of the first source, and the transforming of the first embedding vector into the second embedding vector may include obtaining the second embedding vector by inputting the first embedding vector and source information indicating the first source to the transformation model.

In some embodiments, the target-side embedding space may include an embedding space of a first target and an embedding space of a second target, the second embedding vector is located in the embedding space of the first target, and the transforming of the first embedding vector into the second embedding vector may include obtaining the second embedding vector by inputting the first embedding vector and target information indicating the first target to the transformation model.

According to another aspect of the inventive concept, there is provided an embedding transformation system. The embedding transformation system may include one or more processors and a memory configured to store one or more instructions, wherein the one or more processors are configured to execute the stored one or more instructions to obtain a source-side embedding model, transform source-side data into a first embedding vector through the source-side embedding model, and transform the first embedding vector into a second embedding vector located in a target-side embedding space through a transformation model.

In some embodiments, the transformation model may be trained using the source-side embedding model and a target-side embedding model, and the source-side embedding model and the target-side embedding model may be pre-trained models.

In some embodiments, the one or more processors may be further configured to transform target-side data into a third embedding vector through a target-side embedding model and train the transformation model based on a difference between the second embedding vector and the third embedding vector, wherein the target-side data corresponds to the source-side data.

In some embodiments, the source-side data may be text in a source language, and the one or more processors may be further configured to translate the text in the source language into text in a target language by decoding the second embedding vector through a target-side decoder.

According to still another aspect of the inventive concept, there is provided a non-transitory computer-readable recording medium storing computer program executable by at least one processor to execute obtaining a source-side embedding model, transforming source-side data into a first embedding vector through the source-side embedding model, and transforming the first embedding vector into a second embedding vector located in a target-side embedding space through a transformation model.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
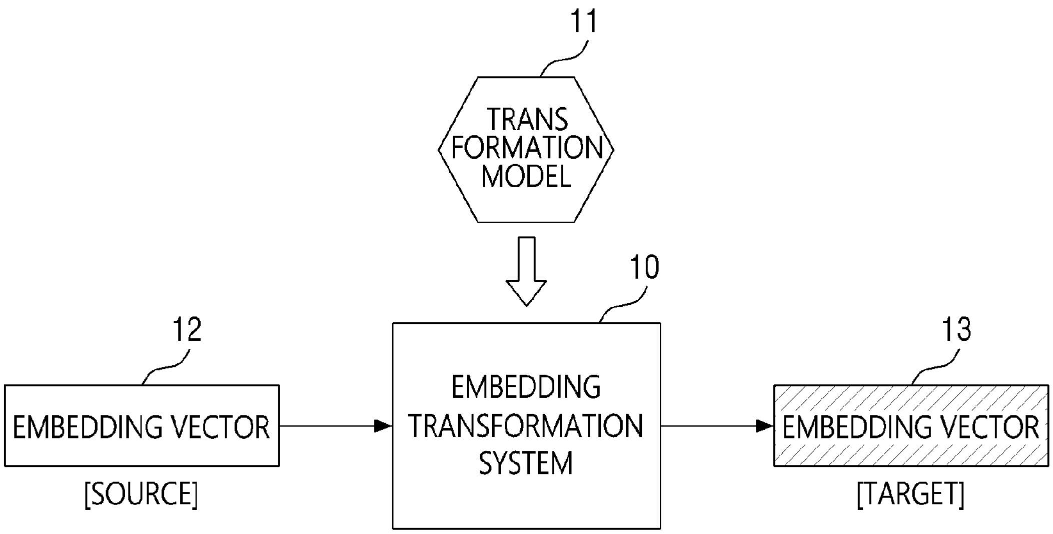
FIG. 1 is an example diagram illustrating an embedding transformation system according to embodiments of the present disclosure.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

FIG. 1 is an example diagram schematically illustrating an embedding transformation system 10 according to embodiments of the present disclosure.

As illustrated in FIG. 1, the embedding transformation system 10 may be a system that performs embedding transformation between a source side and a target side. That is, the embedding transformation system 10 may transform an embedding vector of the source side into an embedding vector of the target side. For example, when the source side is a first language (e.g., Korean) and the target side is a second language (e.g., English), the embedding transformation system 10 may transform an embedding vector (e.g., 12) of the first language into an embedding vector (e.g., 13) of the second language.

For reference, since an embedding vector is a vector representation in an embedding space, it may be used interchangeably with the term 'embedding representation' in some cases. In addition, in the art to which the present disclosure pertains, the embedding vector may be used interchangeably with terms such as 'latent vector', 'latent code', 'embedding code', and 'latent representation'. For ease of description, the embedding transformation system 10 will hereinafter be abbreviated to a 'transformation system 10'.

More specifically, the transformation system 10 may train a transformation model 11 using a dataset (i.e., a paired dataset) composed of pairs of source-side data and target-side data and may transform an embedding vector 12 of the source side into an embedding vector 13 of the target side using the trained transformation model 11. The detailed structure and training method of the transformation model 11 will be described in detail with reference to FIG. 6 and subsequent drawings.

The transformation system 10 may perform a target task using the trained transformation model 11. Examples of the target task may include a machine translation task, a multimodal (cross-modal) task (e.g., image captioning, visual question answering, text-to-image search, or image-to-text search), a task related to domain transformation (e.g., image domain transformation), or a combination thereof. However, the scope of the present disclosure is not limited thereto, and examples of the target task may include various types of deep learning tasks without limitation.

Figure 2:
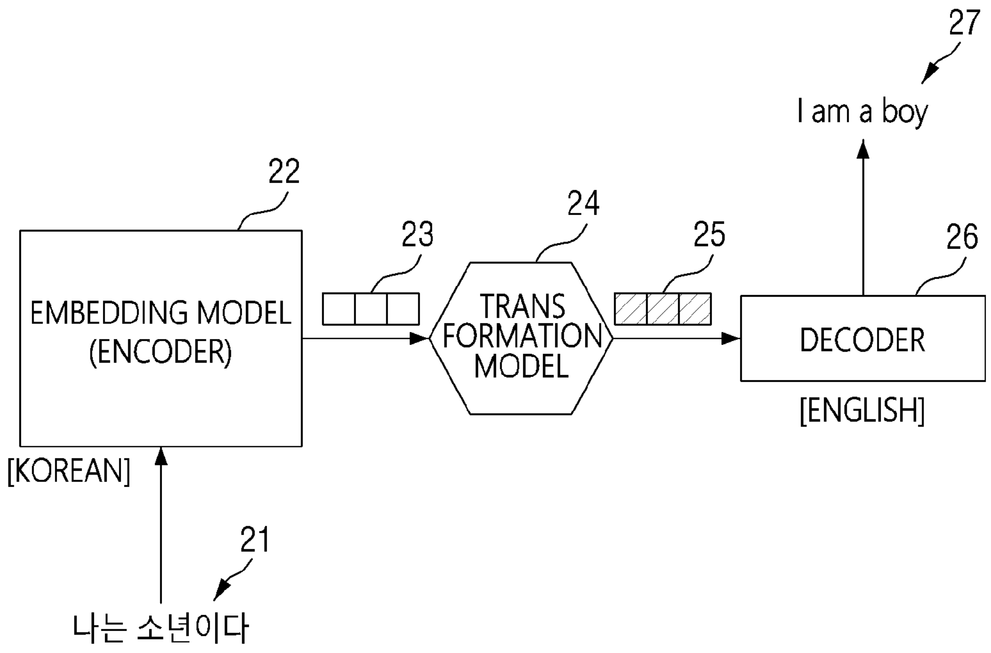
FIGS. 2 and 3 are example diagrams for explaining a process of performing a machine translation task according to embodiments of the present disclosure.
Figure 3:
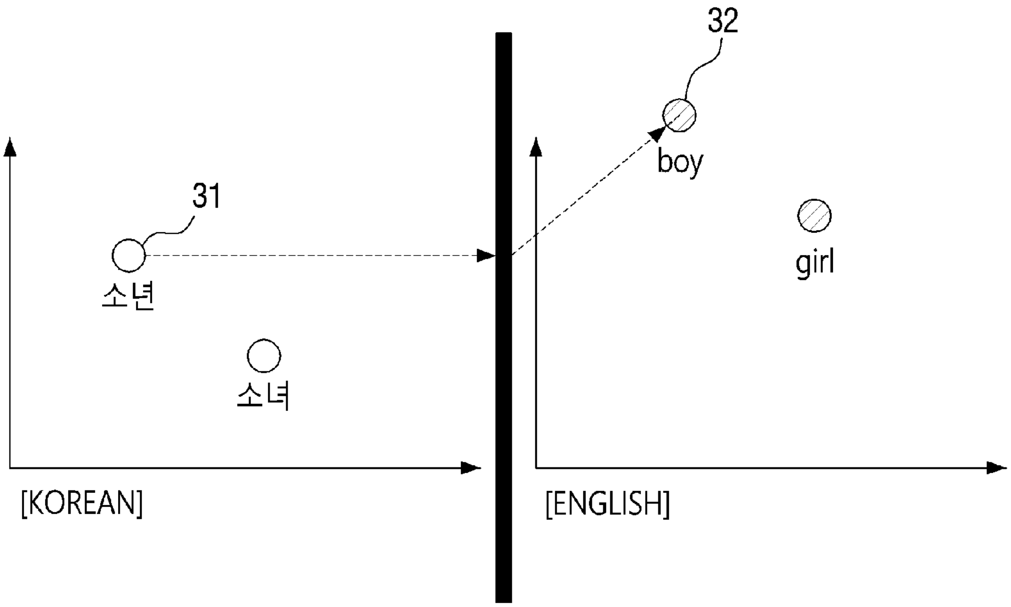

In a specific example, the transformation system 10 may perform a machine translation task between two languages. For example, as illustrated in FIG. 2, the transformation system 10 may translate a Korean text 21('나는 소년이다') into an English text 27 ('I am a boy') using a trained transformation model 24. The entire translation process is briefly as follows. The transformation system 10 may first transform the Korean text 21 into a first embedding vector 23 through a Korean (source-side) embedding model 22. Then, the transformation system 10 may transform the first embedding vector 23 into a second embedding vector 25 located in an English embedding space through the transformation model 24 (see the transformation process and 31 and 32 in FIG. 3). Finally, the transformation system 10 may decode the second embedding vector 25 through a target-side decoder 26 trained to output English text from an embedding vector, thereby translating the Korean text 21 into the English text 27. The transformation model 24 can perform the above transformation by learning a mapping relationship (i.e., an embedding relationship) between the embedding spaces of the two languages. This will be described later.

Figure 4:
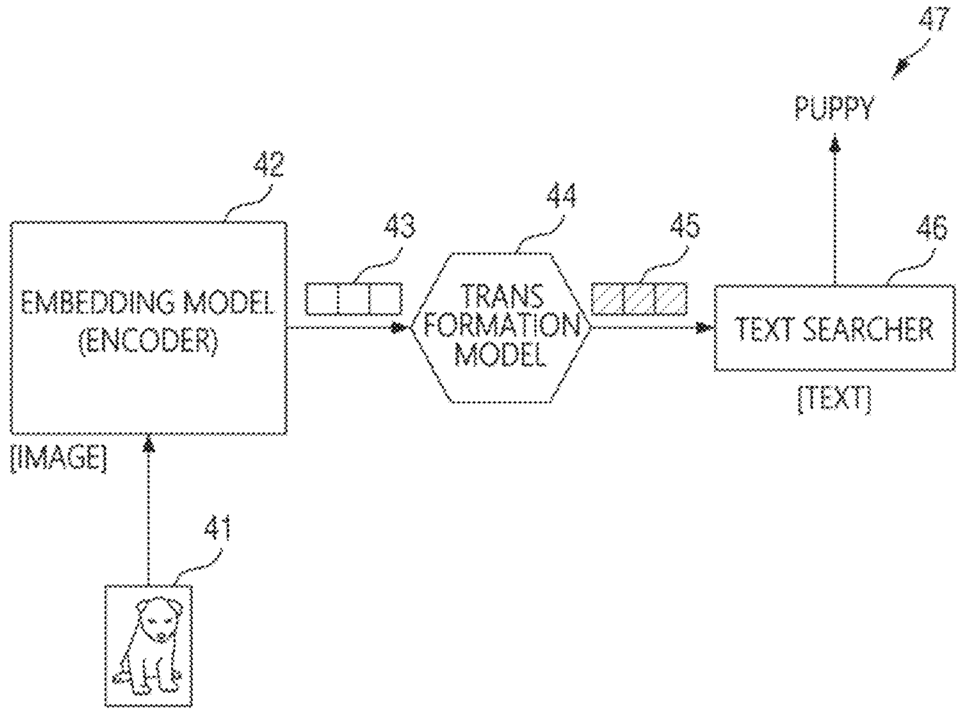
FIGS. 4 and 5 are example diagrams for explaining a process of performing a multimodal task according to embodiments of the present disclosure.

For reference, since an embedding model is a module that encodes input data into an embedding vector, it may be named 'encoder' in some cases (see FIGS. 2 and 4). In addition, a text (natural language) embedding model may be used interchangeably with terms such as 'text encoder', 'natural language processing model', and 'language model' in the art to which the present disclosure pertains.

Figure 5:
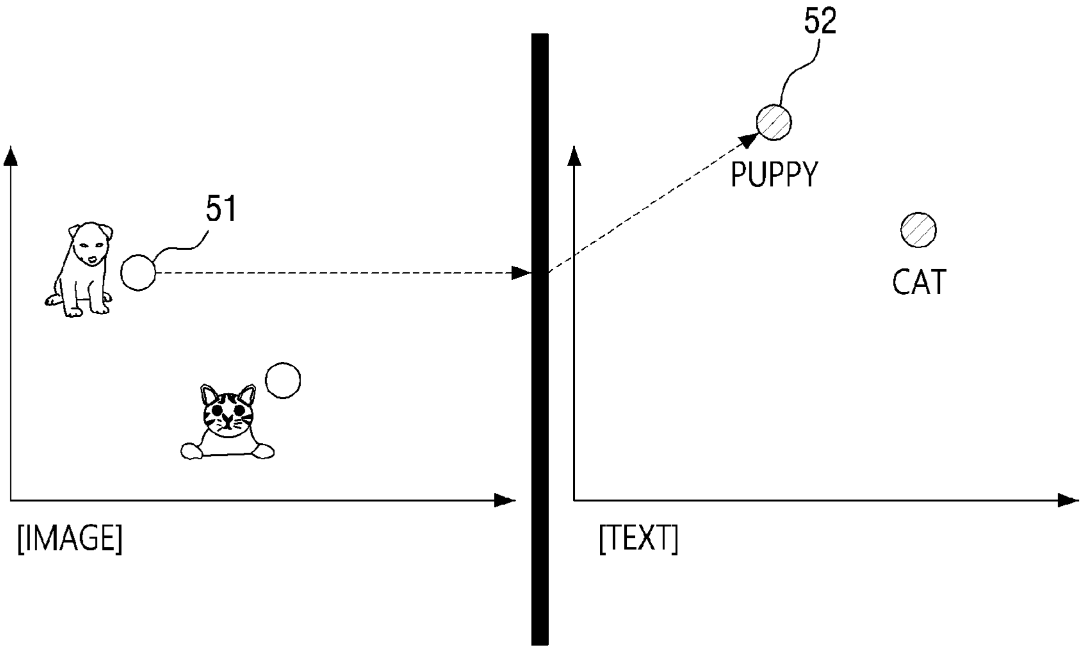

In another example, the transformation system 10 may perform a multimodal (cross-modal) task. For example, as illustrated in FIG. 4, the transformation system 10 may automatically generate a caption 47 for a given image 41 using a trained transformation model 44. The entire caption generation process is briefly as follows. The transformation system 10 may transform the given image 41 into a first embedding vector 43 through an image (source-side) embedding model 42. Then, the transformation system 10 may transform the first embedding vector 43 into a second embedding vector 45 located in a text embedding space through the transformation model 44 (see the transformation process and 51 and 52 in FIG. 5). Finally, the transformation system 10 may generate a similar text 47 for the second embedding vector 45 as a caption of the image 41 through a searcher 46 that searches for similar text in the text embedding space.

For reference, in FIG. 1, a case where the transformation system 10 performs unidirectional embedding transformation is illustrated as an example. However, the transformation system 10 may also perform bidirectional embedding transformation. For example, the transformation system 10 may perform bidirectional embedding transformation using one transformation model (e.g., 11) trained to perform bidirectional embedding transformation or may perform bidirectional embedding transformation using multiple transformation models trained to perform embedding transformation in different directions.

In addition, in FIG. 1, a case where the transformation model 11 performs embedding transformation between one source and one target (i.e., one-to-one embedding transformation) is illustrated as an example. However, the transformation model 11 may also perform embedding transformation between multiple sources and multiple targets (e.g., one-to-many, many-to-one, or many-to-many embedding transformation). This may be understood from the description of FIGS. 19 through 23.

A specific method of performing embedding transformation using the transformation system 10 will be described in more detail with reference to FIG. 6 and subsequent drawings.

The transformation system 10 may be implemented in at least one computing device. For example, all functions of the transformation system 10 may be implemented in one computing device, or a first function of the transformation system 10 may be implemented in a first computing device, and a second function may be implemented in a second computing device. Alternatively, a certain function of the transformation system may be implemented in a plurality of computing devices.

Figure 24:
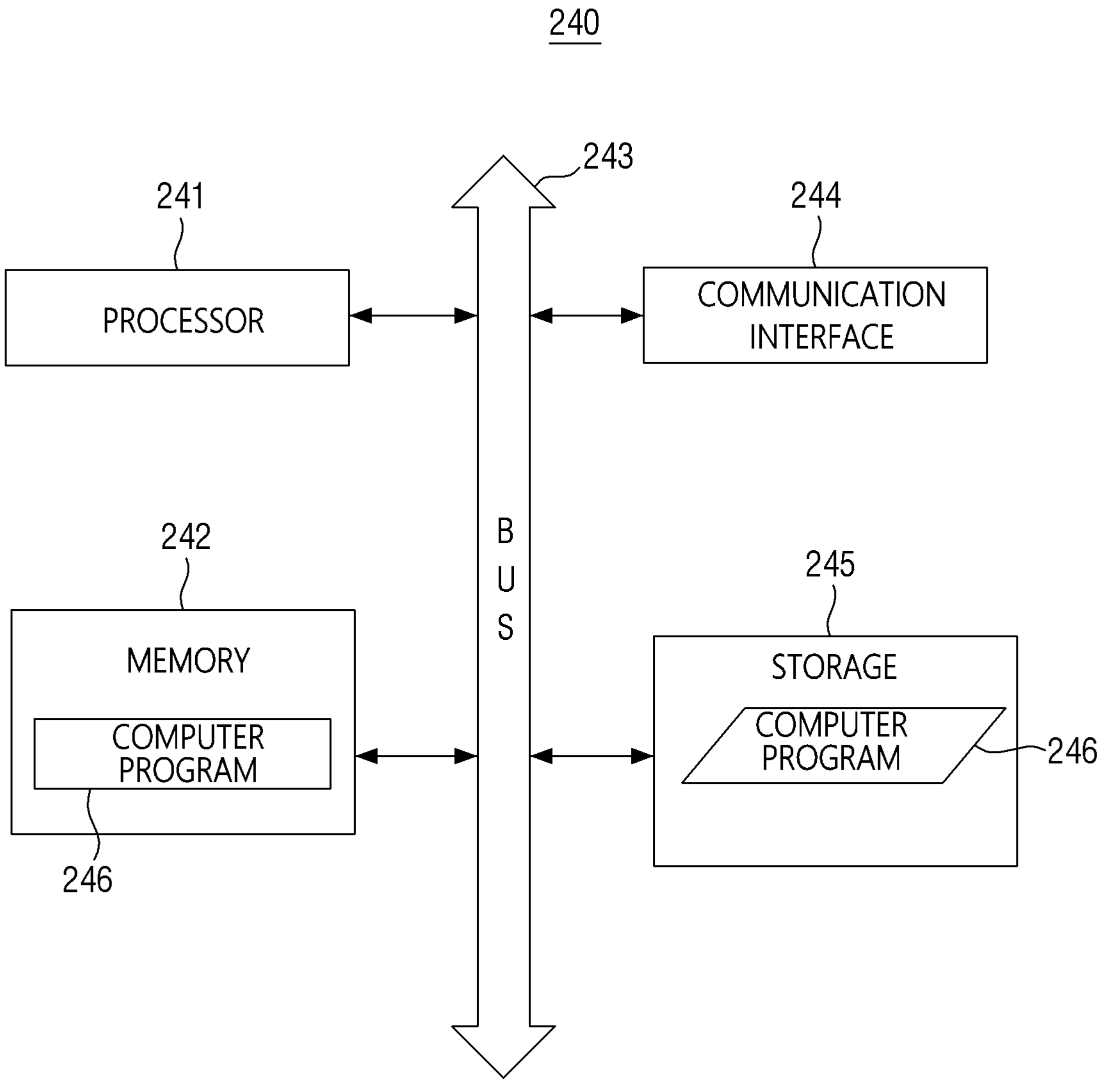
FIG. 24 illustrates an example computing device that can implement the embedding transformation system according to the embodiments of the present disclosure.

A computing device may be any device having a computing function, and an example of this device is illustrated in FIG. 24. Since the computing device is a collection of various components (e.g., a memory, a processor, etc.) interacting with each other, it may be named a 'computing system' in some cases. In addition, the computing system may also refer to a collection of a plurality of computing devices interacting with each other.

Until now, the transformation system 10 according to the embodiments of the present disclosure has been roughly described with reference to FIGS. 1 through 5. Hereinafter, various methods that can be performed by the above-described transformation system 10 will be described with reference to FIG. 6 and subsequent drawings.

For ease of understanding, the description will be continued based on the assumption that all steps/operations of the methods to be described later are performed by the above-described transformation system 10. Therefore, when the subject of a specific step/operation is omitted, it may be understood that the step/operation is performed by the transformation system 10. However, in a real environment, some steps of the methods to be described later may also be performed by another computing device. For example, training a transformation model (e.g., 11 in FIG. 1) may also be performed by another computing device.

First, an embedding transformation method according to embodiments of the present disclosure will be described with reference to FIGS. 6 through 13. For ease of understanding, it will be assumed that a transformation model performs transformation between one source and one target (i.e., one-to-one embedding transformation). Unless otherwise mentioned, the description will be continued based on the assumption that a target task of the transformation system 10 is a 'machine translation task'.

Figure 6:
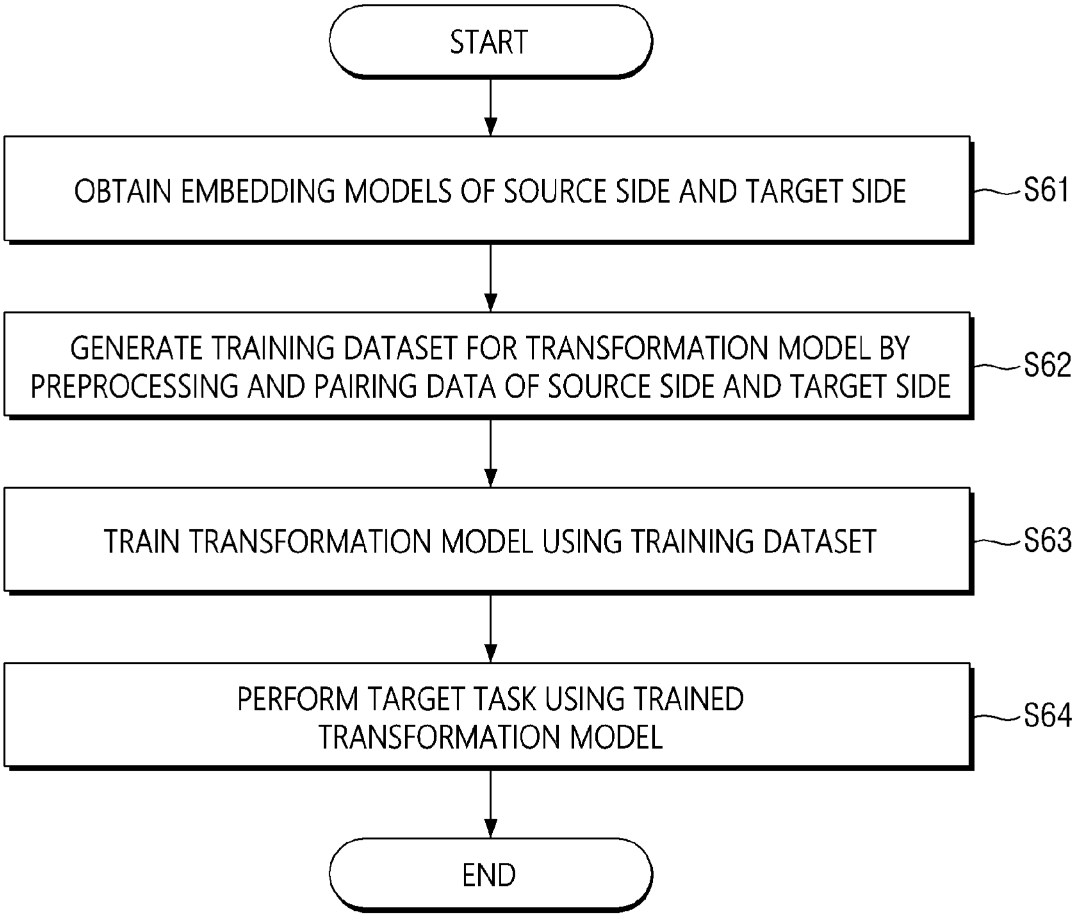
FIG. 6 is an example flowchart schematically illustrating an embedding transformation method according to embodiments of the present disclosure.

FIG. 6 is an example flowchart schematically illustrating an embedding transformation method according to embodiments of the present disclosure. However, this is only an exemplary embodiment for achieving the objectives of the present disclosure, and some operations can be added or deleted as needed.

As illustrated in FIG. 6, the embedding transformation method according to the embodiments may start with operation S61 in which an embedding model of a source side and an embedding model of a target side are obtained.

The obtained embedding models (i.e., the embedding models of the source side and/or the target side) may have various structures according to the type of data to be embedded. For example, a model for embedding text may be composed of a recurrent neural network (RNN) or a transformer-based neural network (e.g., BERT). For another example, a model for embedding an image may be composed of a convolutional neural network (CNN)-based neural network. However, the scope of the present disclosure is not limited by these examples, and an embedding model can have any structure as long as it can appropriately transform input data into an embedding vector.

Figure 7:
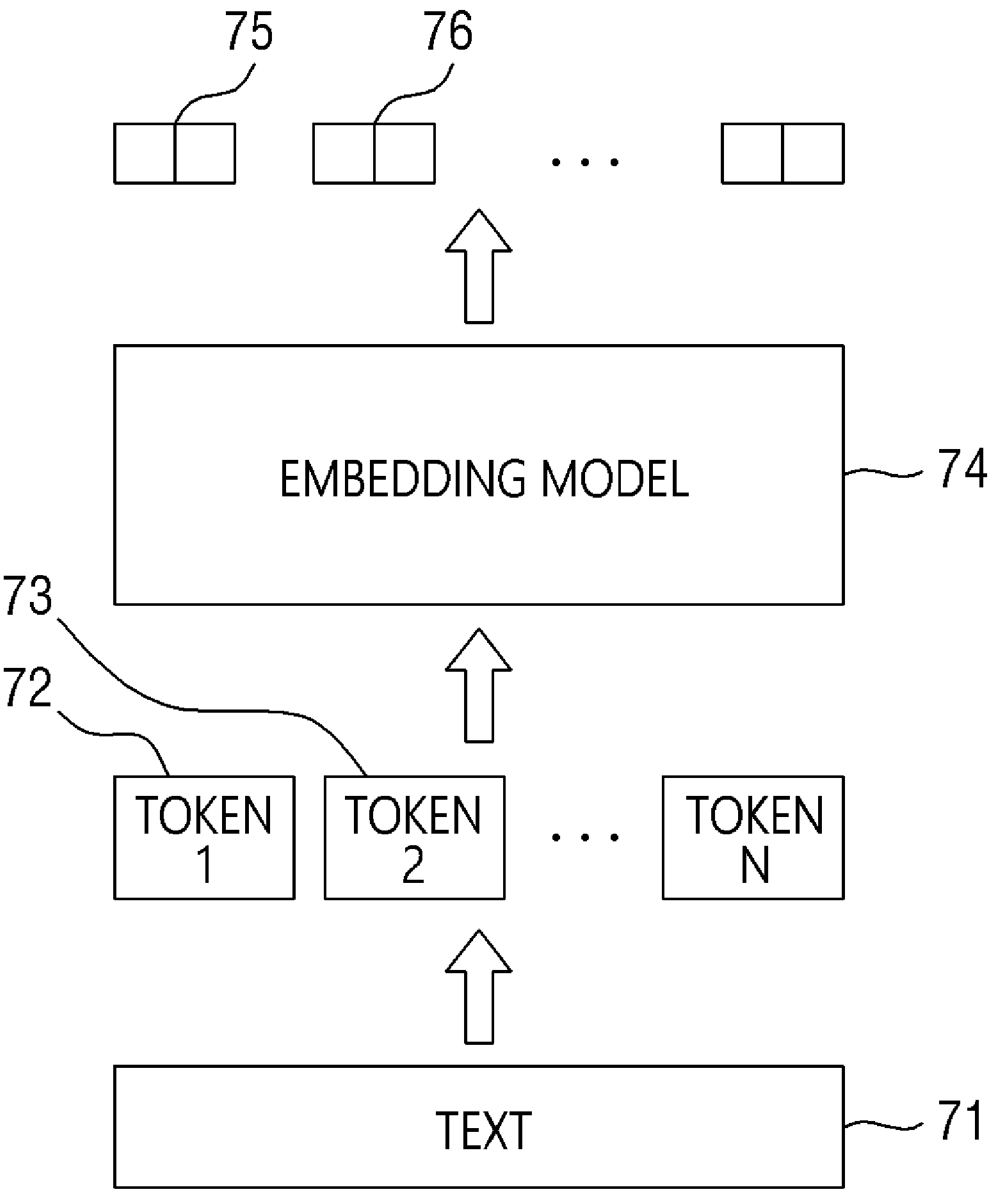
FIGS. 7 and 8 are example diagrams illustrating structures of embedding models according to embodiments of the present disclosure.
Figure 8:
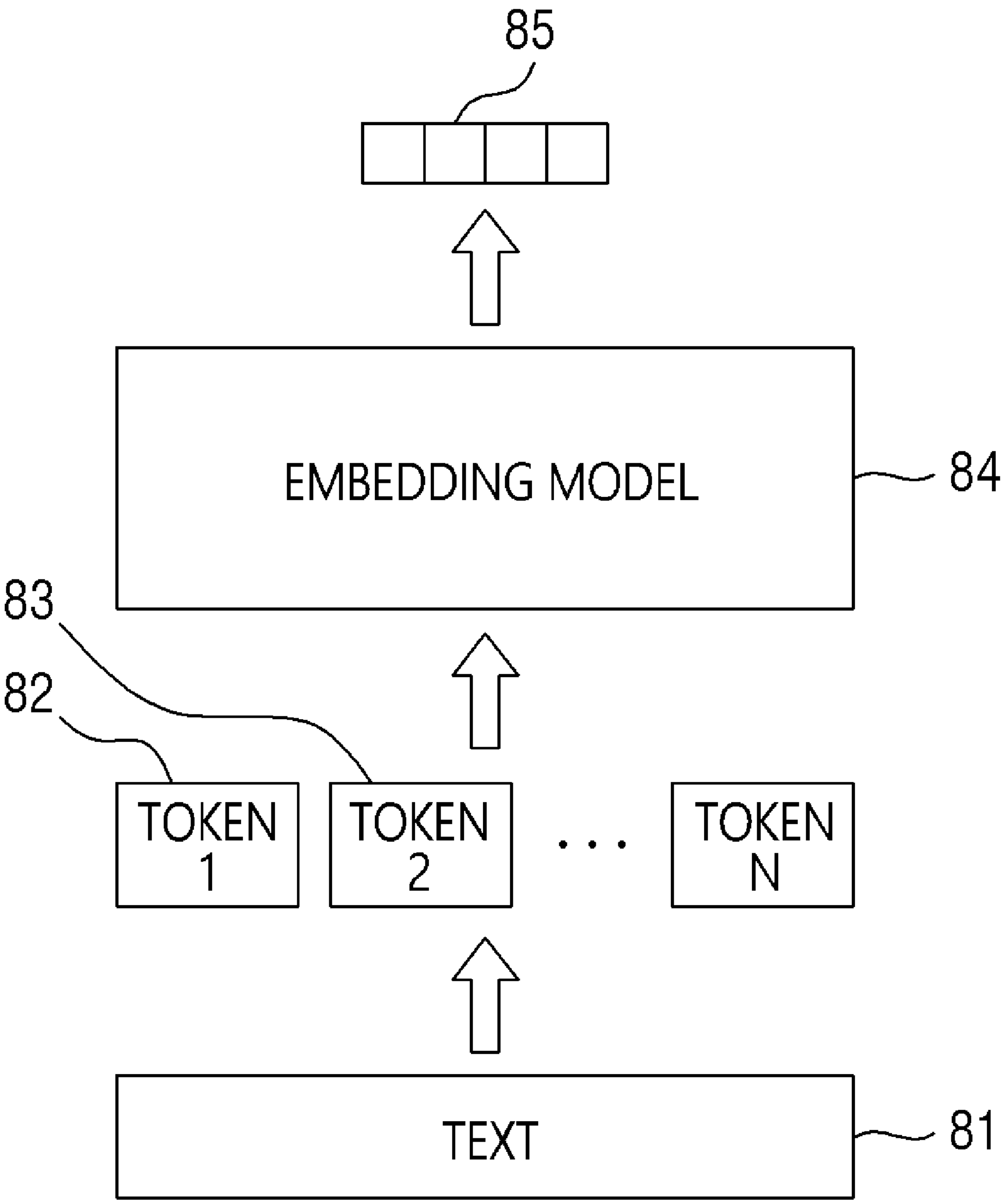

For reference, a text embedding model may be configured to output embedding vectors on a token-by-token basis or may be configured to compress input text into a single embedding vector and output the single embedding vector. For example, as illustrated in FIG. 7, an embedding model 74 (e.g., a transformer-based embedding model such as BERT) may be configured to receive a token sequence (e.g., 72 and 73) for a given text 71 (e.g., a text sentence) and output embedding vectors (e.g., 75 and 76) on a token-by-token basis. For another example, as illustrated in FIG. 8, an embedding model 84 (e.g., an RNN-based embedding model) may be configured to receive a token sequence (e.g., 82 and 83) for a given text 81 and output a single embedding vector 85 (e.g., a context vector).

In addition, a transformation model to be described later may also output embedding vectors on a token-by-token basis or output a single embedding vector. For example, the transformation model may receive source-side embedding vectors on a token-by-token basis and output target-side embedding vectors on a token-by-token basis. Alternatively, the transformation model may receive a single source-side embedding vector and output a single target-side embedding vector. Alternatively, the transformation model may receive source-side embedding vectors on a token-by-token basis and output a single target-side embedding vector.

In some embodiments, the obtained embedding models (i.e., the embedding models of the source side and/or the target side) may be pretrained models. For example, the embedding model of the source side may be a model trained using a first language training dataset (i.e., corpus), and the embedding model of the target side may be a model trained using a second language training dataset. In this case, since a training cost required for an embedding model can be reduced, the overall time and computing costs required to train a transformation model (or to perform a task) can be greatly reduced.

Referring back to FIG. 6, in operation S62, a training dataset for a transformation model may be generated by preprocessing and pairing data (sets) of the source side and the target side. For example, the transformation system 10 may configure a training dataset (i.e., a paired dataset) for the transformation model by pairing source-side data (i.e., each data instance constituting a dataset) with target-side data (i.e., a target-side data instance corresponding to the source-side data instance) and repeating this process.

A specific method of preprocessing data of the source side and the target side may vary according to the type of the data and the structure of the embedding model. For example, when the type of the data of the source side and the target side is text, the transformation system 10 may perform preprocessing such as dividing a given text into sentences and tokenizing the sentences. However, the scope of the present disclosure is not limited thereto.

At least some of the source-side data and the target-side data may have a one-to-many (or many-to-many) correspondence. In this case, if a transformation model is trained by paring the same source-side data with different target-side data, confusion may occur in training the transformation model (so-called 'one-to-many problem'). To solve this problem, in some embodiments of the present disclosure, type information for distinguishing multiple targets may be added to a training dataset. If the source-side data and the target-side data have a many-to-one correspondence, type information for distinguishing multiple sources may be added to the training dataset. For better understanding, the current embodiments will be further described with reference to FIG. 9.

Figure 9:
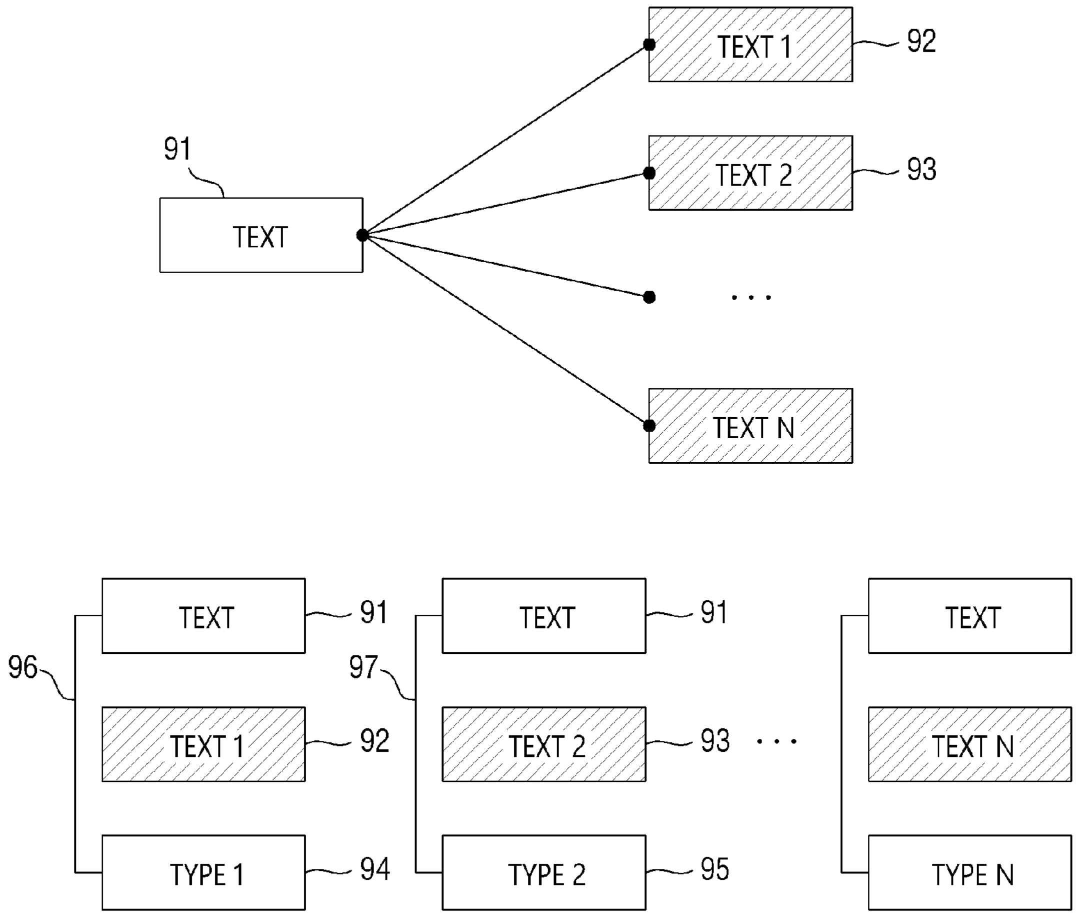
FIG. 9 is an example diagram for explaining a method of generating a training dataset for solving a one-to-many problem according to embodiments of the present disclosure.

As illustrated in FIG. 9, it is assumed that the transformation model is a model for machine translation between Korean and English and that there is a correspondence (i.e., a one-to-many correspondence) between a specific English text 91 and a plurality of Korean texts (e.g., 92 and 93). In this case, the transformation system 10 may form different pairs of the specific English text 91 and the Korean texts (e.g., 92 and 93) and add type information (e.g., 94 and 95) for distinguishing the Korean texts (e.g., 92 and 93) to the data pairs (e.g., 96 and 97). The type information (e.g., 94 and 95) can be defined in any way. The type information (e.g., 94 and 95) is used for training the transformation model to prevent confusion that may occur in a training process (e.g., if there is no type information, confusion occurs in training because multiple target-side embedding vectors (i.e., correct answers) correspond to one source-side embedding vector). For example, the transformation model may be trained to receive an embedding vector of the English text 91 and type information (e.g., 94 or 95) and transform the received embedding vector into an embedding vector of a Korean text (e.g., 92 or 93) specified by the type information. Therefore, confusion in the training process can be prevented.

For reference, the meaning of type may vary according to which characteristic (criteria) is used to classify (distinguish) multiple targets and may be determined by a target task. For example, it is assumed that the target task is a machine translation task that provides differential translation quality. In this case, texts (e.g., 92 and 93) in a target language which correspond to a text (e.g., 91) in a source language may be classified according to translation quality (e.g., high quality, medium quality, and low quality), and the type may mean translation quality. In addition, the transformation system 10 may provide a translation service with differential quality by transforming an embedding vector of the source language into an embedding vector (i.e., an embedding vector of the target language) of a quality indicated by the type information through a trained transformation model. In another example, it is assumed that the target task is a machine translation task that provides a differential translation length (or quality). In this case, texts (e.g., 92 and 93) in the target language which correspond to a text (e.g., 91) in the source language may be classified according to text length (e.g., long sentence, short sentence, etc.), and the type may mean text length (or quality). In another example, it is assumed that the target task is a machine translation task that considers a text domain (e.g., an economic, social, or technological field). In this case, texts (e.g., 92 and 93) in the target language which correspond to a text (e.g., 91) in the source language may be classified according to domain, and the type may mean domain. In addition, the transformation system 10 may provide a high-quality translation service that considers a text domain by transforming an embedding vector of the source language into an embedding vector of a domain indicated by the type information through a trained transformation model.

Referring back to FIG. 6, in operation S63, a transformation model may be trained using the generated training dataset. However, a specific training method may vary according to embodiments.

In some embodiments, the transformation model may be trained based on a difference between an embedding vector transformed by the transformation model and an embedding vector transformed by the embedding model of the target side. The current embodiments will be described in more detail later with reference to FIGS. 14 and 15.

In some embodiments, an embedding vector transformed by the transformation model may be decoded through a decoder of the target side, and the transformation model may be trained based on a difference between the decoding result and correct answer data (i.e., target-side data). The current embodiments will be described in more detail later with reference to FIGS. 16 and 17.

In some embodiments, the transformation model may be trained based on various combinations of the above embodiments.

The detailed structure of the transformation model may also vary according to embodiments.

Figure 10:
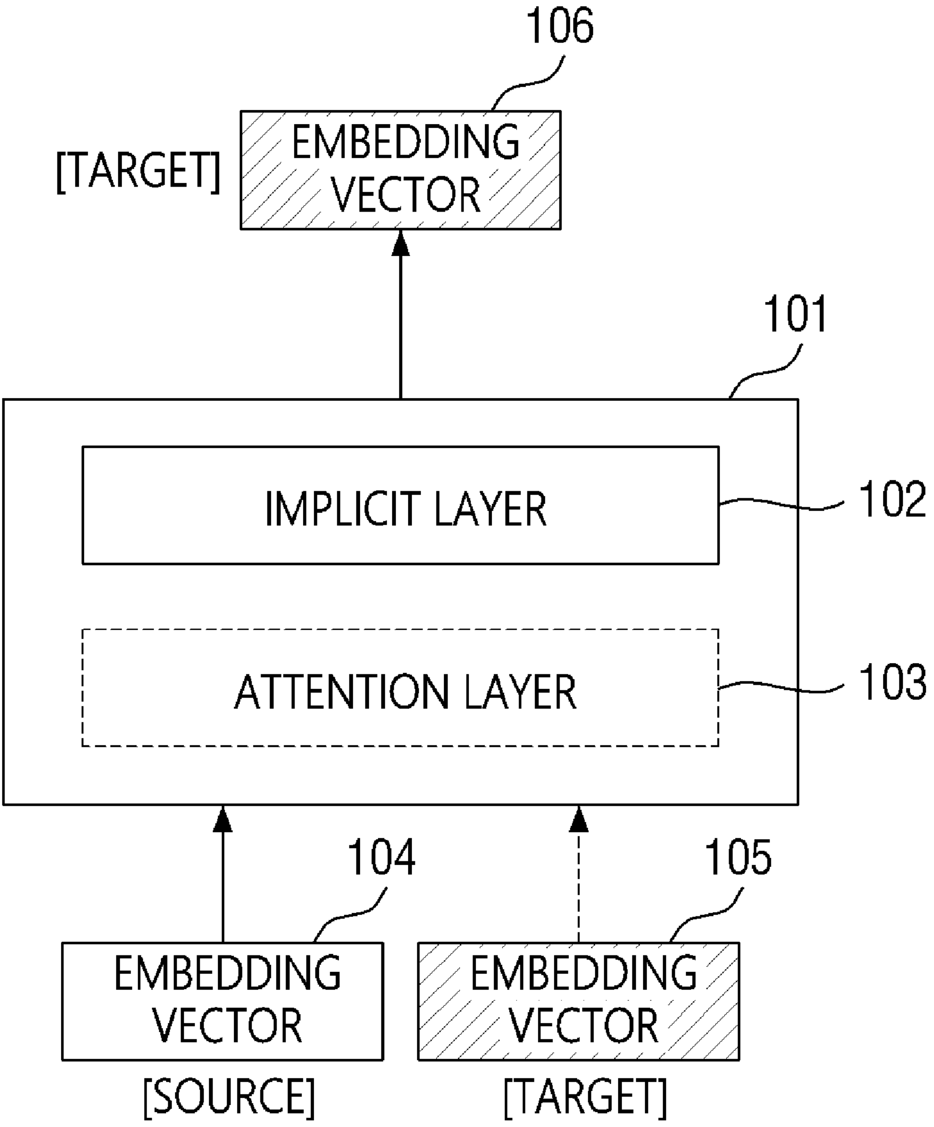
FIGS. 10 through 12 are example diagrams illustrating structures and inputs and outputs of transformation models according to embodiments of the present disclosure.

In some embodiments, the transformation model may be implemented (configured) based on an implicit layer. For example, as illustrated in FIG. 10, a transformation model 101 may be configured to include at least one implicit layer 102. In addition, the transformation model 101 may be configured to receive a source-side embedding vector 104 and output a target-side embedding vector 106 or may be configured to further receive a target-side embedding vector 105. In a training process, a correct answer embedding vector (i.e., an embedding vector transformed by the embedding model of the target side) may be input as the target-side embedding vector 105. In an inference process, at least some of the target-side embedding vector 106 output from the transformation model 101 may be input to the transformation model 101 so that the target-side embedding vector 106 can be output in an auto-regressive manner (e.g., in a case where target-side embedding vectors are output on a token-by-token basis in an auto-regressive manner). However, the scope of the present disclosure is not limited thereto.

Figure 11:
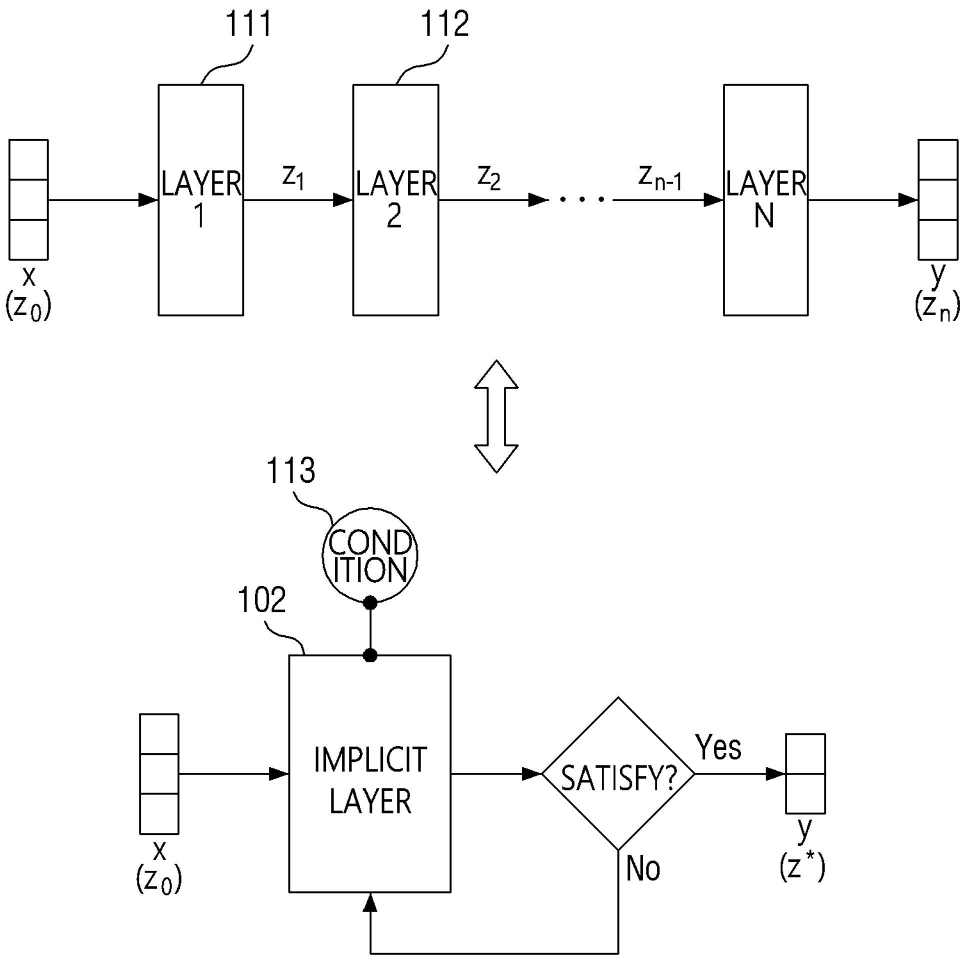

For reference, as illustrated in FIG. 11, the implicit layer 102 may be a layer that repeatedly performs a layer operation (e.g., a fixed-point arithmetic operation) based on the value of a weight parameter of the layer 102 until a condition 113 set in the layer 102 is satisfied. An example of the implicit layer 102 may be a layer configured to repeatedly perform a fixed-point arithmetic operation using an output value as an input (e.g., a layer configured to perform a fixed-point arithmetic operation until a difference between output and input values of the layer converge within a certain range), but the scope of the present disclosure is not limited thereto. In addition, the condition set in the layer 102 may be a condition based on a maximum number of iterations or a condition in which the value of an equation based on a weight parameter converges within a certain range, but the scope of the present disclosure is not limited thereto. Since the implicit layer 102 repeatedly performs a layer operation, it can be viewed as a compressed form of a number of explicit layers (e.g., 111 and 112). In addition, it is known that one implicit layer 102 can replace multiple explicit layers (e.g., 111 and 112). Therefore, if the transformation model 101 is configured based on the implicit layer 102, the number of layers (or the number of weight parameters) of the transformation model 101 can be greatly reduced. Accordingly, the time and computing costs required for training can be further reduced. The concept and operation principle of the implicit layer will be already familiar to those skilled in the art, and thus a further description thereof will be omitted.

Figure 12:
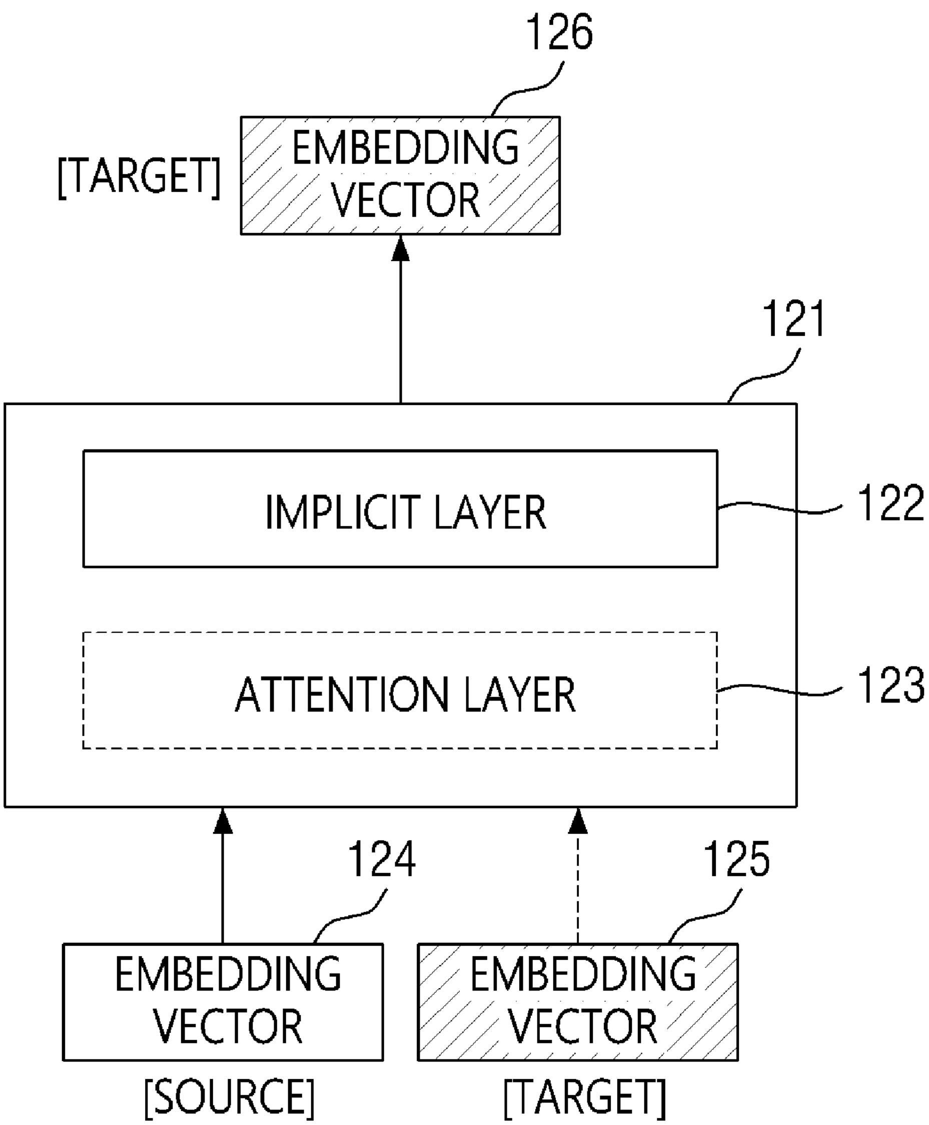

In some embodiments, the transformation model may be implemented (configured) based on an explicit layer. For example, as illustrated in FIG. 12, a transformation model 121 may be configured to include at least one explicit layer 122. Here, the explicit layer 122 may refer to a general layer (e.g., a dense/MLP layer) that performs a layer operation (i.e., a neural network operation) once on the value of a weight parameter and an input value and outputs the result of the layer operation. In the current embodiments, the transformation model 121 may also be configured to receive a source-side embedding vector 124 and output a target-side embedding vector 126 or may be configured to further receive a target-side embedding vector 125.

In some embodiments, the transformation model may be configured to further include an attention layer. For example, as illustrated in FIG. 10 or 12, the transformation model 101 or 121 may be configured to include at least one attention layer 103 or 123. The attention layer 103 or 123 may collect an input embedding vector (e.g., 104 or 124) and inform about a portion to focus on. The concept and operation principle of the attention layer will be already familiar to those skilled in the art, and thus a detailed description thereof will be omitted. For reference, if the transformation model 101 or 121 receives only the source-side embedding vector 104 or 124, the attention layer 103 or 123 may be implemented based on a self-attention module. If the transformation model 101 or 121 further receives the target-side embedding vector 105 or 125, the attention layer 103 or 123 may be implemented based on another attention module (e.g., an encoder-decoder attention module of a transformer). However, the scope of the present disclosure is not limited thereto.

In some embodiments, the transformation model may be implemented (configured) based on various combinations of the above embodiments. For example, as illustrated in FIG. 10 or 12, the transformation model 101 or 121 may be implemented (configured) based on various combinations of the attention layer (e.g., 103 or 123), the implicit layer 102, and the explicit layer 122.

Figure 13:
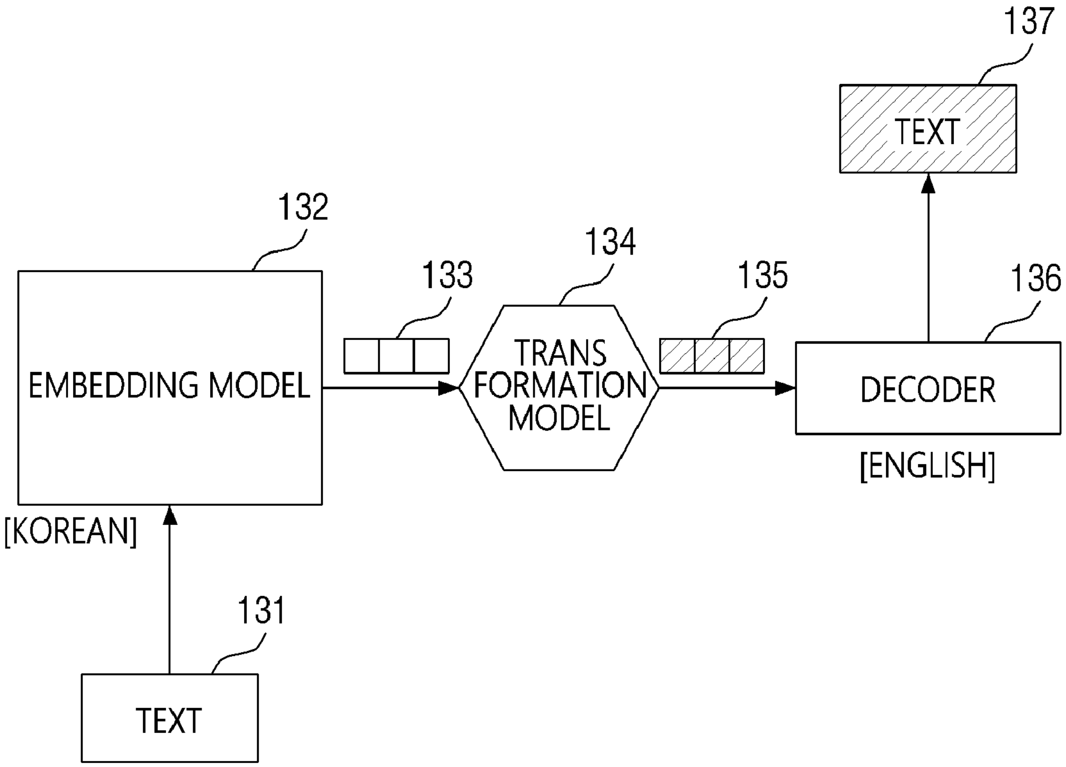
FIG. 13 is an example diagram for explaining a process of performing a machine translation task using a transformation model according to embodiments of the present disclosure.

Referring back to FIG. 6, in operation S64, a target task may be performed using the trained transformation model. For example, the transformation system 10 may perform a machine translation task, a multimodal task, a task related to domain transformation, and the like. However, the scope of the present disclosure is not limited thereto. A process in which the machine translation task is performed will be briefly described with reference to FIG. 13. FIG. 13 illustrates a case where the target task is a 'Korean-English machine translation task'.

As illustrated in FIG. 13, the transformation system 10 may translate a Korean text 131 into an English text 137 through a trained transformation model 134. Specifically, the transformation system 10 may transform a specific Korean text 131 into a first embedding vector 133 through a Korean (source-side) embedding model 132 and transform the first embedding vector 133 into a second embedding vector 135 of an English embedding space through the trained transformation model 134. Then, the transformation system 10 may decode the second embedding vector 135 through a decoder 136 of the target side, thereby translating the Korean text 131 into the English text 137. In this example, the decoder 136 may be a neural network trained to decode an embedding vector and output text. The decoder 136 may be trained independently from or together with the transformation model 134. This may be understood from the description of FIGS. 16 through 18.

Until now, the embedding transformation method according to the embodiments of the present disclosure has been described with reference to FIGS. 6 through 13. According to the above description, embedding transformation between the source side and the target side can be accurately performed using a transformation model trained on an embedding relationship between the source side and the target side. In addition, various target tasks can be performed easily and efficiently (i.e., at low cost) using a transformation model. For example, a machine translation task between two different languages can be easily performed using a transformation model trained on an embedding relationship between the two languages. Alternatively, a multimodal (cross-modal) task related to two different modals can be easily performed using a transformation model trained on an embedding relationship between the two modals.

In addition, since a pretrained embedding model is used, the time and computing costs required to build a model for performing various target tasks can be significantly reduced. That is, since the cost required to train an embedding model is reduced, the overall time and computing costs required to build a model for performing target tasks can be significantly reduced.

Embodiments related to a method of training a transformation model will now be described with reference to FIGS. 14 through 18.

First, a method of training a transformation model according to embodiments of the present disclosure will be described with reference to FIGS. 14 and 15.

Figure 14:
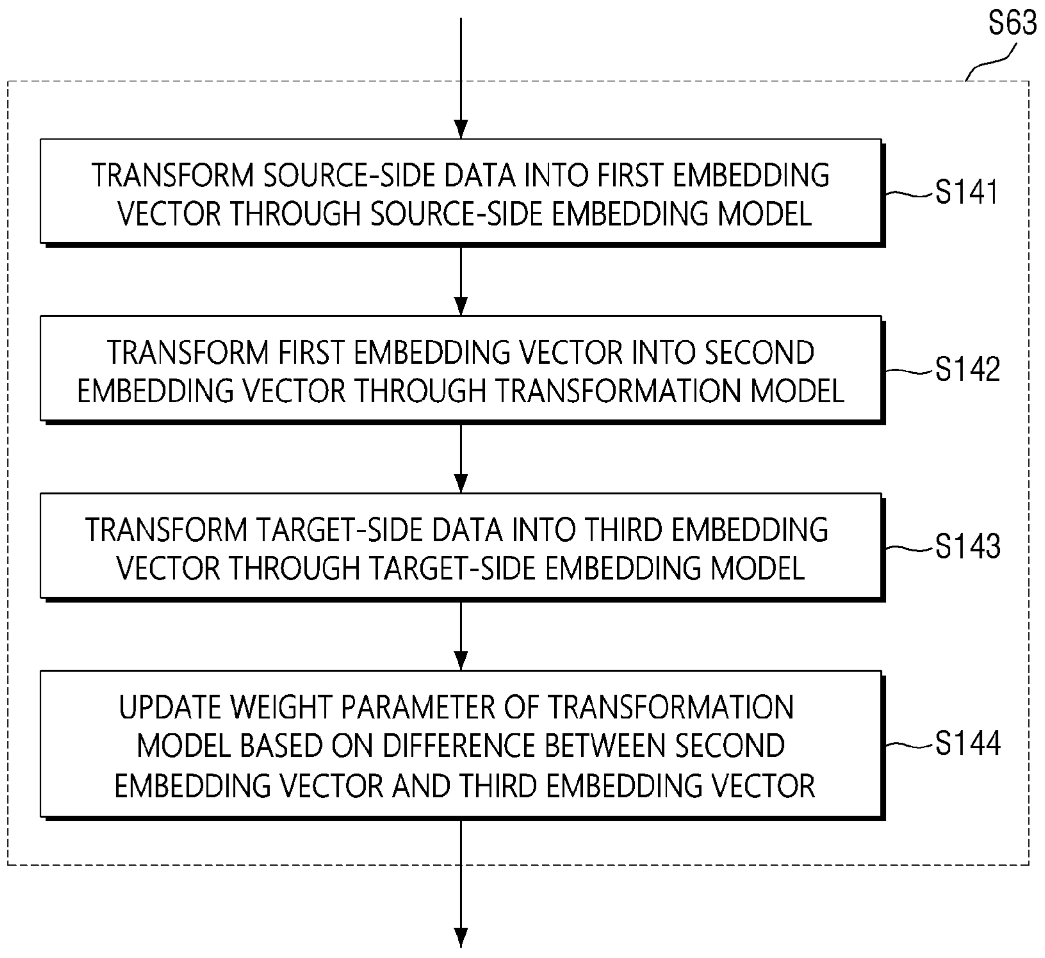
FIGS. 14 and 15 are example diagrams for explaining a method of training a transformation model according to embodiments of the present disclosure.

FIG. 14 is an example flowchart illustrating a method of training a transformation model according to embodiments of the present disclosure. However, this is only an exemplary embodiment for achieving the objectives of the present disclosure, and some operations can be added or deleted as needed.

As illustrated in FIG. 14, the method of training the transformation model according to the embodiments may start with operation S141 in which source-side data (i.e., a data instance) is transformed into a first embedding vector through a source-side embedding model. As described above, a training dataset for the transformation model may be composed of pairs of source-side data and target-side data, and in some cases, each data pair constituting the training dataset may further include type information for distinguishing multiple targets and/or multiple sources.

In operation S142, the first embedding vector (i.e., the source-side embedding vector) may be transformed into a second embedding vector (i.e., a target-side embedding vector) through the transformation model. That is, the transformation model may receive the first embedding vector, perform an appropriate operation on the first embedding vector, and output the second embedding vector obtained as a result of the operation.

In operation S143, target-side data may be transformed into a third embedding vector through a target-side embedding model.

In operation S144, a weight parameter of the transformation model may be updated based on a difference between the second embedding vector and the third embedding vector. For example, the transformation system 10 may calculate the difference (e.g., loss) between the second embedding vector and the third embedding vector (e.g., through cosine similarity) and may update the weight parameter of the transformation model in a direction to reduce the calculated difference. The transformation system 10 may update only the transformation model in a state where the source-side embedding model and the target-side embedding model are frozen or may update the transformation model together with at least one embedding model.

Operations S141 through S144 described above may be repeatedly performed for other data pairs included in the training dataset. In so doing, the transformation model can have the ability to transform (map) a source-side embedding vector into a target-side embedding vector.

For better understanding, the above-described training method will be further described with reference to the example illustrated in FIG. 15. In FIG. 15, it is assumed that the target task is a 'Korean-English machine translation task'.

Figure 15:
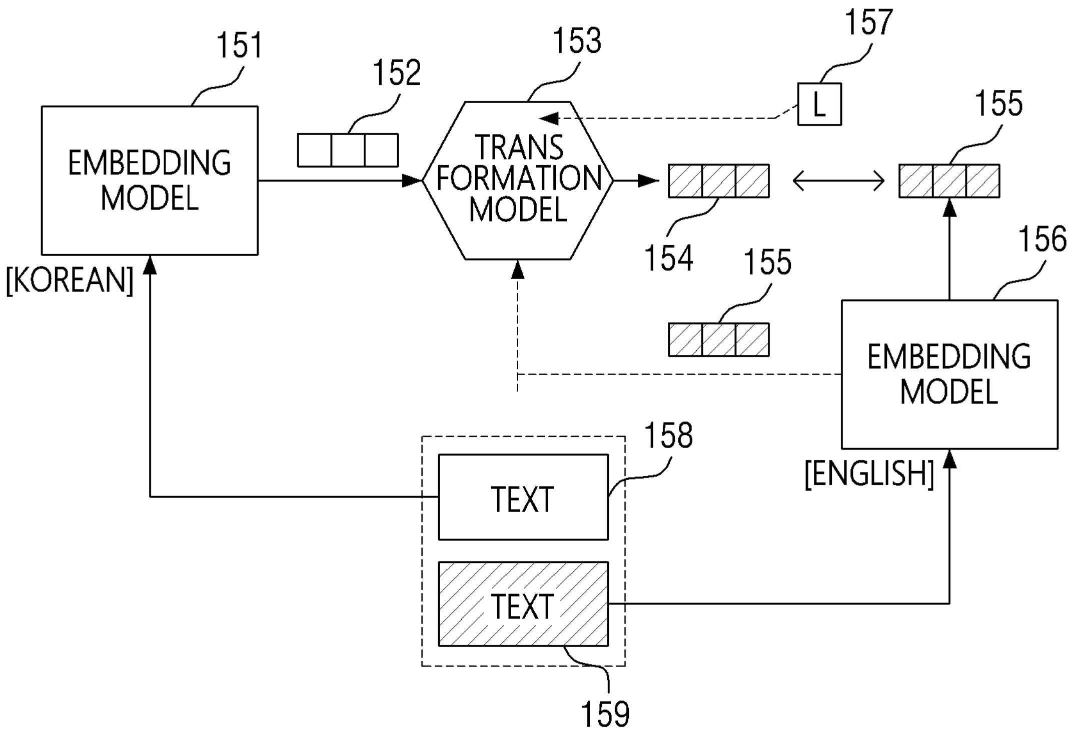

As illustrated in FIG. 15, the transformation system 153 may transform a Korean text 158 in a data pair into a first embedding vector 152 through a Korean (source-side) embedding model 151.

Then, the transformation system 10 may transform the first embedding vector 152 into a second embedding vector 154 through a transformation model 153. Here, the transformation system 10 may also obtain the second embedding vector 154 by further inputting a third embedding vector 155 to the transformation model 153. The third embedding vector 155 may be an embedding vector of an English text 159 transformed through an English (target-side) embedding model 156 and may be a target-side embedding vector corresponding to a correct answer.

Next, the transformation system 10 may update a weight parameter of the transformation model 153 based on a difference (e.g., loss 157) between the second embedding vector 154 and the third embedding vector 155.

As these processes are repeated, the transformation model 153 can have the ability to accurately transform (map) a Korean (source-side) embedding vector into an English (target-side) embedding vector.

A method of training a transformation model according to embodiments of the present disclosure will now be described with reference to FIGS. 16 and 17. For clarity of the present disclosure, any description overlapping that of the previous embodiments will be omitted.

Figure 16:
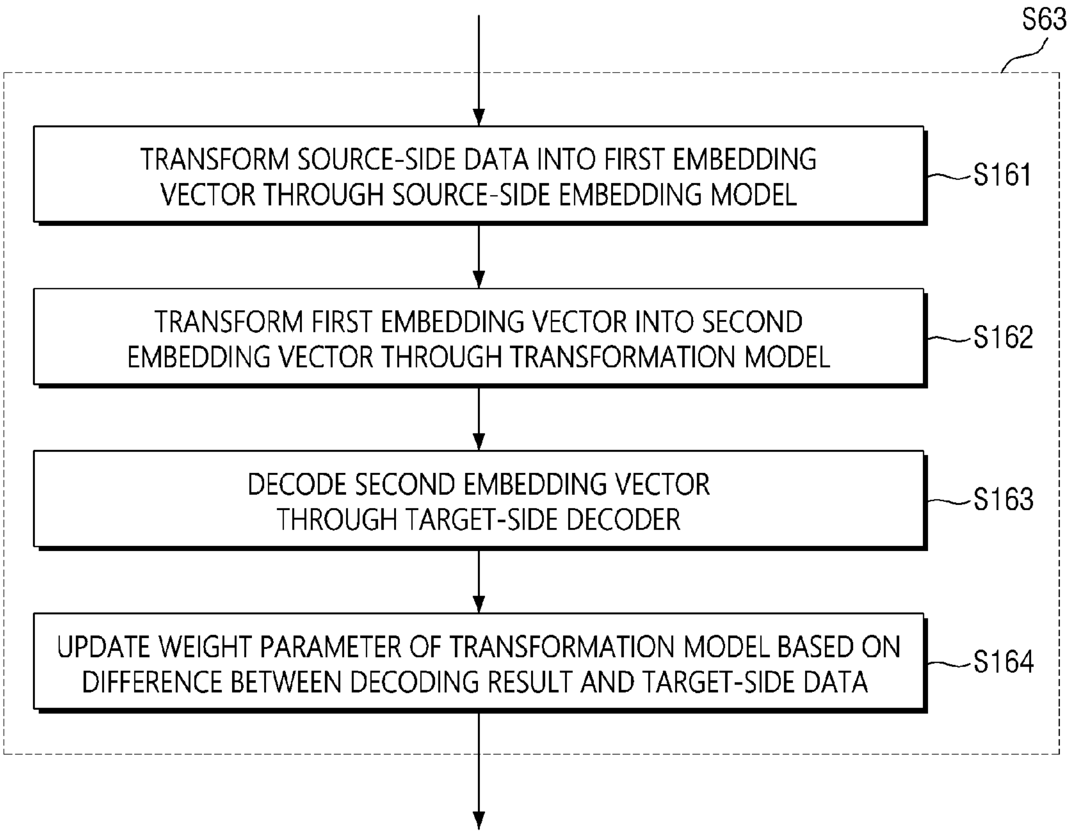
FIGS. 16 and 17 are example diagrams for explaining a method of training a transformation model according to embodiments of the present disclosure.

FIG. 16 is an example flowchart illustrating a method of training a transformation model according to embodiments of the present disclosure. However, this is only an exemplary embodiment for achieving the objectives of the present disclosure, and some operations can be added or deleted as needed.

As illustrated in FIG. 16, the method of training the transformation model according to the embodiments may also start with operation S161 in which source-side data (i.e., a data instance) is transformed into a first embedding vector through a source-side embedding model.

In operation S162, the first embedding vector may be transformed into a second embedding vector through the transformation model.

In operation S163, the second embedding vector may be decoded through a target-side decoder. Here, the target-side decoder may be a neural network configured to decode an input embedding vector and output corresponding target-side data.

In operation S164, a weight parameter of the transformation model may be updated based on a difference between the decoding result and target-side data (i.e., target-side data or correct answer data in a data pair). For example, the transformation system 10 may calculate the difference between the decoding result and the correct answer data and update the weight parameter of the transformation model in a direction to reduce the calculated difference. Here, the transformation system 10 may further update the target-side decoder. The source-side embedding model may be in a frozen state or may be updated together with the transformation model.

Operations S161 through S164 described above may be repeatedly performed for other data pairs included in a training dataset. In so doing, the transformation model can have the ability to transform (map) a source-side embedding vector into a target-side embedding vector.

For better understanding, the above-described training method will be further described with reference to the example illustrated in FIG. 17. In FIG. 17, it is assumed that the target task is a 'Korean-English machine translation task'.

Figure 17:
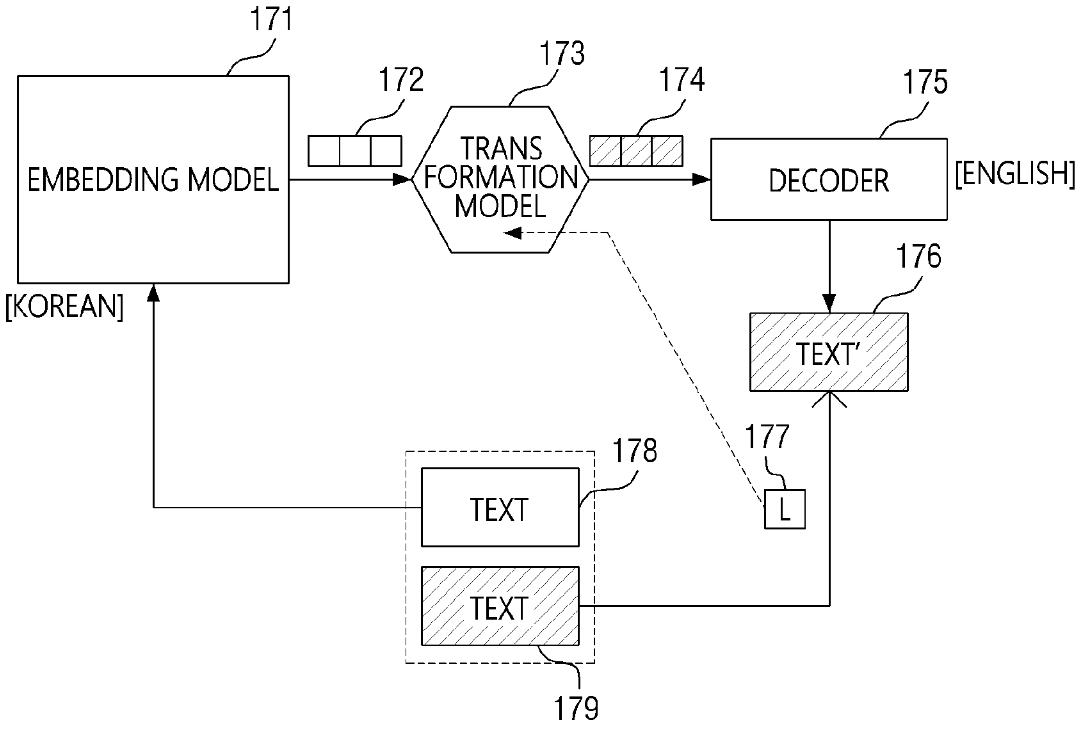

As illustrated in FIG. 17, the transformation system 10 may transform a Korean text 178 in a data pair into a first embedding vector 172 through a Korean (source-side) embedding model 171.

Then, the transformation system 10 may transform the first embedding vector 172 into a second embedding vector 174 through a transformation model 173.

Next, the transformation system 10 may decode the second embedding vector 174 through a target-side decoder 175.

Next, the transformation system 10 may update a weight parameter of the transformation model 173 based on a difference (e.g., loss 177) between the decoding result 176 (i.e., a predicted English text) and an English text 179 (i.e., a correct answer text) in the data pair. In some cases, the transformation system 10 may further update a weight parameter of the target-side decoder 175.

As these processes are repeated, the transformation model 173 can have the ability to accurately transform (map) a Korean (source-side) embedding vector into an English (target-side) embedding vector.

The target-side decoder 175 may also be trained independently from the transformation model 173. For example, the transformation system 10 may independently train the target-side decoder 175 as in the example illustrated in FIG. 18. In addition, the transformation system 10 may link the trained target-side decoder 175 with the transformation model 173 (see FIG. 17) and then additionally train the target-side decoder 175. A source-side decoder may also be trained in a similar way to the target-side decoder 175. A method of training the target-side decoder 175 will be further described below with reference to FIG. 18.

Figure 18:
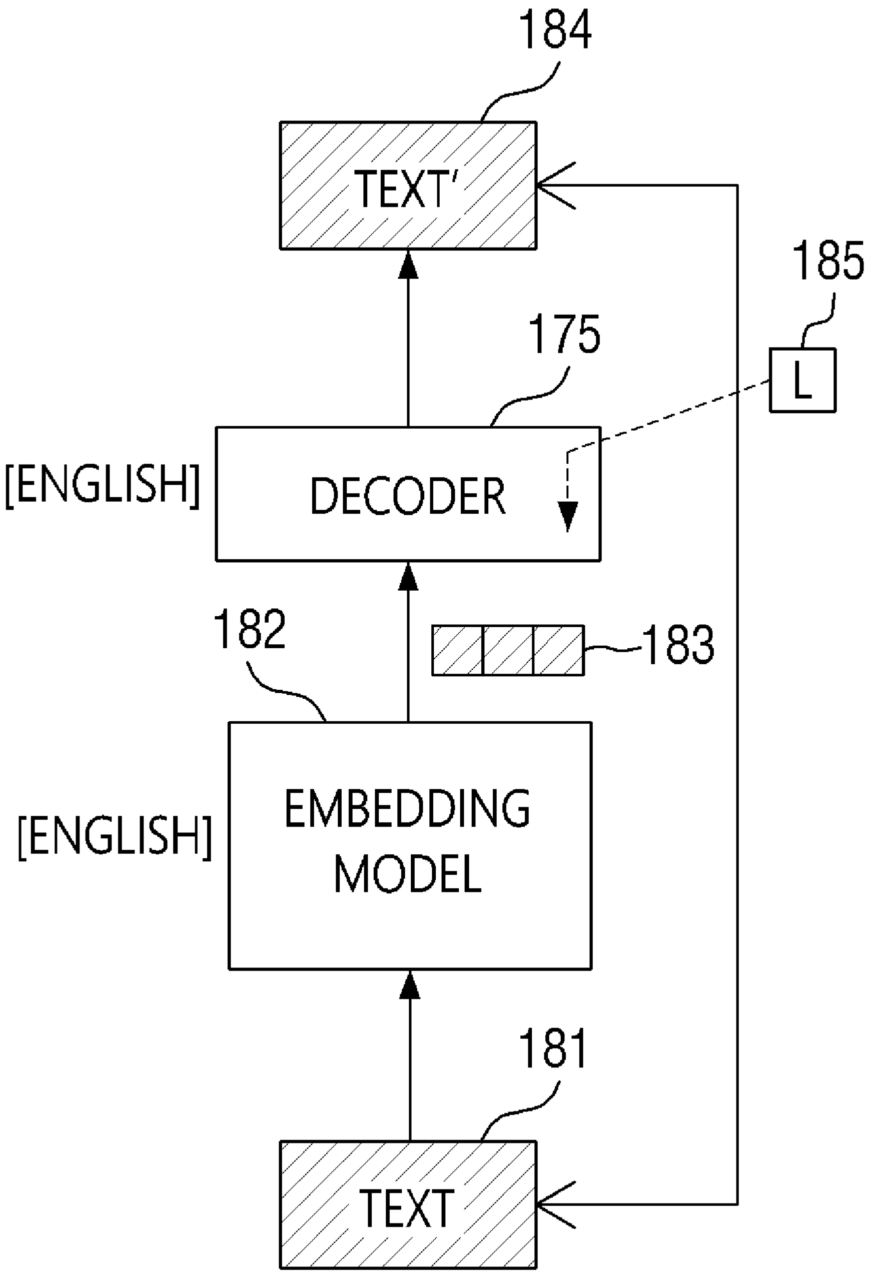
FIG. 18 is an example diagram for explaining a method of training a decoder according to embodiments of the present disclosure.

As illustrated in FIG. 18, the target-side decoder 175 may be trained based on a difference (e.g., loss 185) between a decoding result 184 and an input text 181 of a target-side embedding model 182. Specifically, the transformation system 10 may transform a target-side text 181 into an embedding vector 183 through the target-side embedding model 182 and decode the embedding vector 183 through the decoder 175. In addition, the transformation system 10 may update a weight parameter of the decoder 175 based on the difference between the decoding result 184 and the target-side text 181. As these processes are repeated for various texts, the target-side decoder 175 can have the ability to decode an embedding vector.

For reference, since the decoder 175 is a module specialized for the machine translation task, it may be changed to another module if the target task changes (e.g., see the searcher 46 in FIG. 4). In addition, a method of training a task-specific module (e.g., the decoder 175) may vary according to the type of target task.

Until now, embodiments of the method of training the transformation model have been described with reference to FIGS. 14 through 18. According to the above description, a transformation model can accurately learn an embedding relationship between the source side and the target side by using a training dataset composed of pairs of source-side data and target-side data.

Until now, for ease of understanding, the description has been made based on the assumption that the transformation model performs one-to-one embedding transformation (i.e., embedding transformation between one source and one target). However, the transformation model may also perform many-to-one, one-to-many, or many-to-many embedding transformation. Hereinafter, embodiments related to this will be described.

Figure 19:
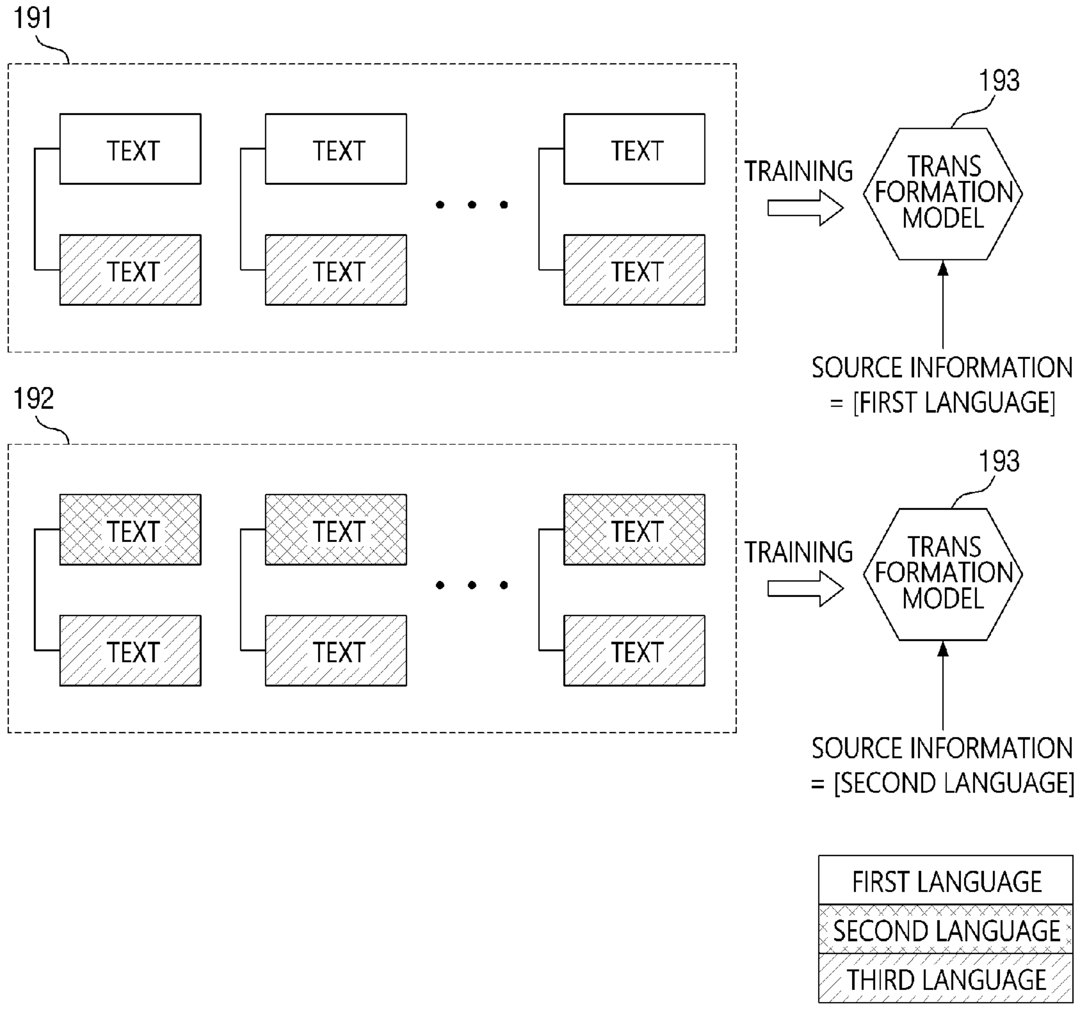
FIGS. 19 and 20 are example diagrams for explaining a many-to-one embedding transformation method according to embodiments of the present disclosure.
Figure 20:
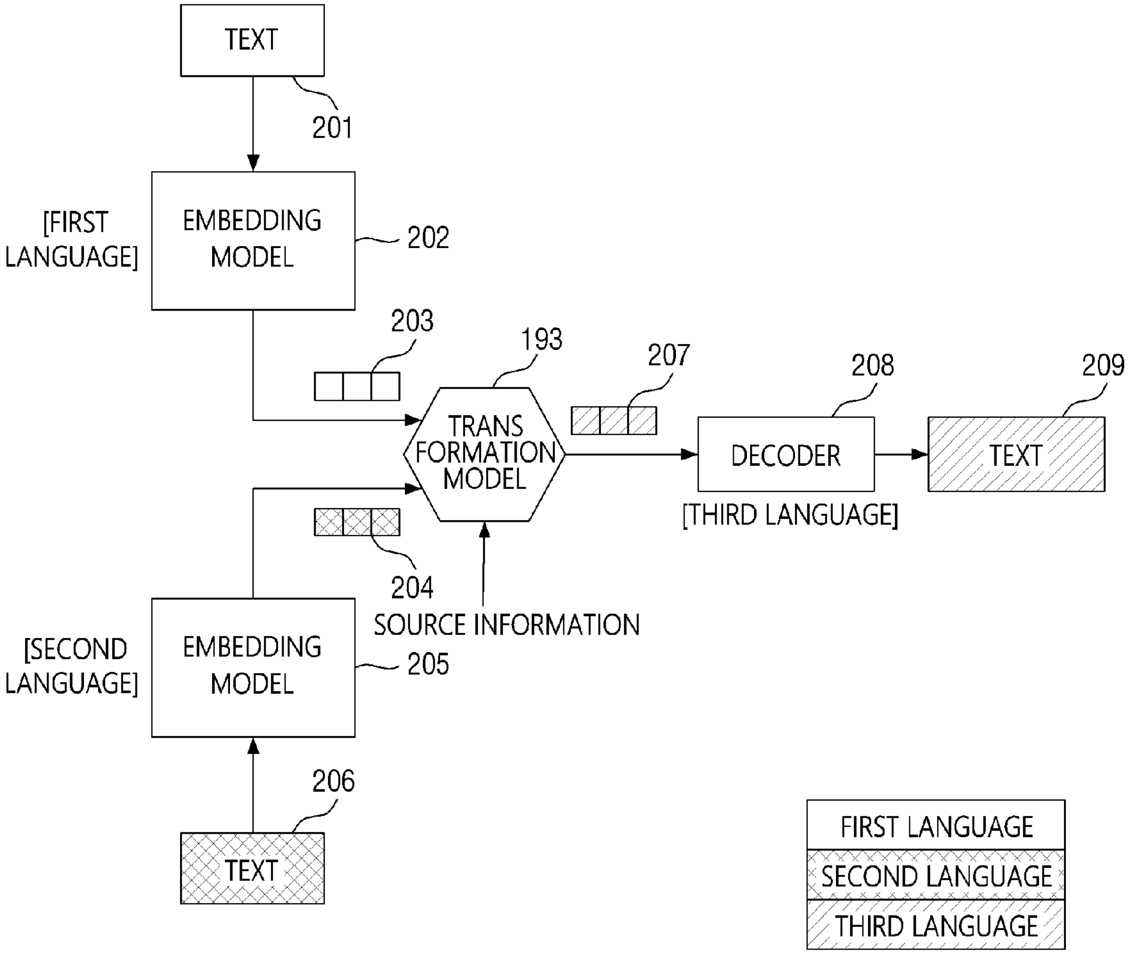

First, a many-to-one embedding transformation method according to embodiments of the present disclosure will be described with reference to FIGS. 19 and 20. In FIGS. 19 and 20, it is assumed that the target task is a 'machine translation task'. However, the following description can be applied to other target tasks (e.g., a multimodal task) without a substantial change in technical spirit. In addition, FIGS. 19 and 20 assume that the number of languages on the source side is two. However, the scope of the present disclosure is not limited thereto, and the number of languages on the source side may also be three or more. In addition, FIG. 20 assumes that texts 201, 206 and 209 in different languages correspond to each other.

As illustrated in FIG. 19, the transformation system 10 may train a transformation model 193 using first and second training datasets 191 and 192. Here, the first training dataset 191 may be a dataset composed of pairs of text in a first language (source side) and text in a third language (target side), and the second training dataset 192 may be a dataset composed of pairs of text in a second language (source side) and text in the third language (target side).

Specifically, the transformation system 10 may train the transformation model 193 using two training datasets 191 and 192 while explicitly providing source information to the transformation model 193. The source information may be information indicating to which of a plurality of sources an embedding vector input to the transformation model 193 belongs. As illustrated, the transformation system 10 may input source information indicating the first language to the transformation model 193 and train the transformation model 193 using the first training dataset 191. In addition, source information indicating the second language may be input to the transformation model 193, and the transformation model 193 may be trained using the second training dataset 192. In so doing, the transformation model 193 can accurately learn a many-to-one embedding relationship. The method of training the transformation model 193 may be understood from the previous description.

When training is completed, as illustrated in FIG. 20, the transformation system 10 may perform a machine translation task between multiple languages through one transformation model 193. Specifically, the transformation system 10 may translate the text 201 in the first language into the text 209 in the third language through the transformation model 193 and translate the text 206 in the second language into the text 209 in the third language.

In other words, the transformation system 10 may transform the text 201 in the first language into an embedding vector 203 of the first language through an embedding model 202 of the first language and may accurately transform the embedding vector 203 into a target-side embedding vector 207 by inputting the embedding vector 203 to the transformation model 193 together with source information indicating the first language. Then, the embedding vector 207 may be decoded into the text 209 in the third language through a target-side decoder 208.

Similarly, the transformation system 10 may transform the text 206 in the second language into an embedding vector 204 of the second language through an embedding model 205 of the second language and may accurately transform the embedding vector 204 into the target-side embedding vector 207 by inputting the embedding vector 204 to the transformation model 193 together with source information indicating the second language. Then, the embedding vector 207 may be decoded into the text 209 in the third language through the target-side decoder 208.

When an embedding model is a model that supports multiple languages (i.e., a multilingual embedding model), source information may be omitted (or changed). For example, when the number of languages on the source side is two and the embedding model supports embedding for two source-side languages, the source information may be omitted (see the description of FIG. 21). Alternatively, if the number of languages on the source side is three and the embedding model supports only embedding for two source-side languages, the total number of source-side embedding models may be two (i.e., a multilingual embedding model for two languages and an embedding model for the other one language). In this case, the source information may be information indicating one of the two embedding models. This will be further described below with reference to FIG. 21.

Figure 21:
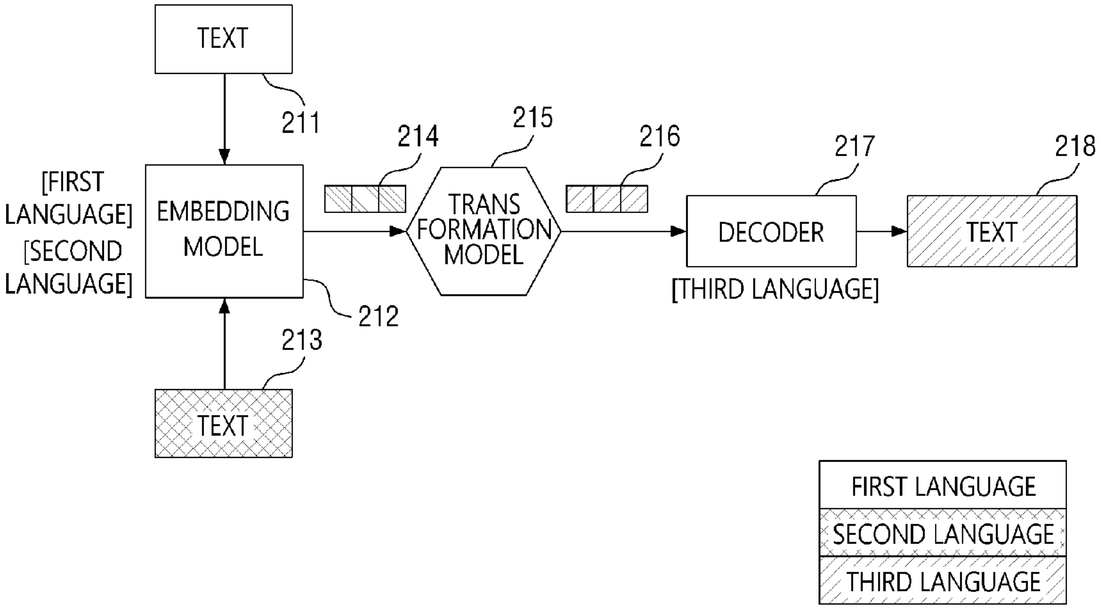
FIG. 21 is an example diagram for explaining a many-to-one embedding transformation method based on a multilingual embedding model according to embodiments of the present disclosure.

In FIG. 21, it is assumed that a source-side embedding model 212 is a multilingual embedding model configured to transform text in the first language and the second language into an embedding vector located in a shared embedding space. In addition, it is assumed that the number of languages on the source side is two (i.e., the first language and the second language) and that texts 211, 213 and 218 in different languages correspond to each other.

As illustrated in FIG. 21, when the multilingual embedding model 212 is applied, translation between multiple languages can be easily performed even if source information is not explicitly provided. For example, the transformation system 10 may transform the text 211 in the first language into a vector 214 of the shared embedding space through the multilingual embedding model 212 and transform the embedding vector 214 into an embedding vector 216 of the third language (target side) through a transformation model 215, thereby translating the text 211 in the first language into the text 218 in the third language. As described above, the text 218 in the third language may be generated through a decoder 217 of the target side. In addition, the transformation system 10 may transform the text 213 in the second language into the vector 214 of the shared embedding space through the multilingual embedding model 212 and transform the embedding vector 214 into the embedding vector 216 of the third language (target side) through the transformation model 215, thereby translating the text 213 in the second language into the text 218 in the third language.

The above description can also be applied to other types of tasks without a substantial change in technical spirit. For example, if the target task is a multimodal task, a multimodal embedding model may play the same role as the multilingual embedding model 212 of FIG. 21.

Until now, the many-to-one embedding transformation methods according to the embodiments of the present disclosure have been described with reference to FIGS. 19 through 21. Hereinafter, a one-to-many embedding transformation method according to embodiments of the present disclosure will be described with reference to FIGS. 22 and 23. For clarity of the present disclosure, any description overlapping that of the previous embodiments will be omitted.

Figure 22:
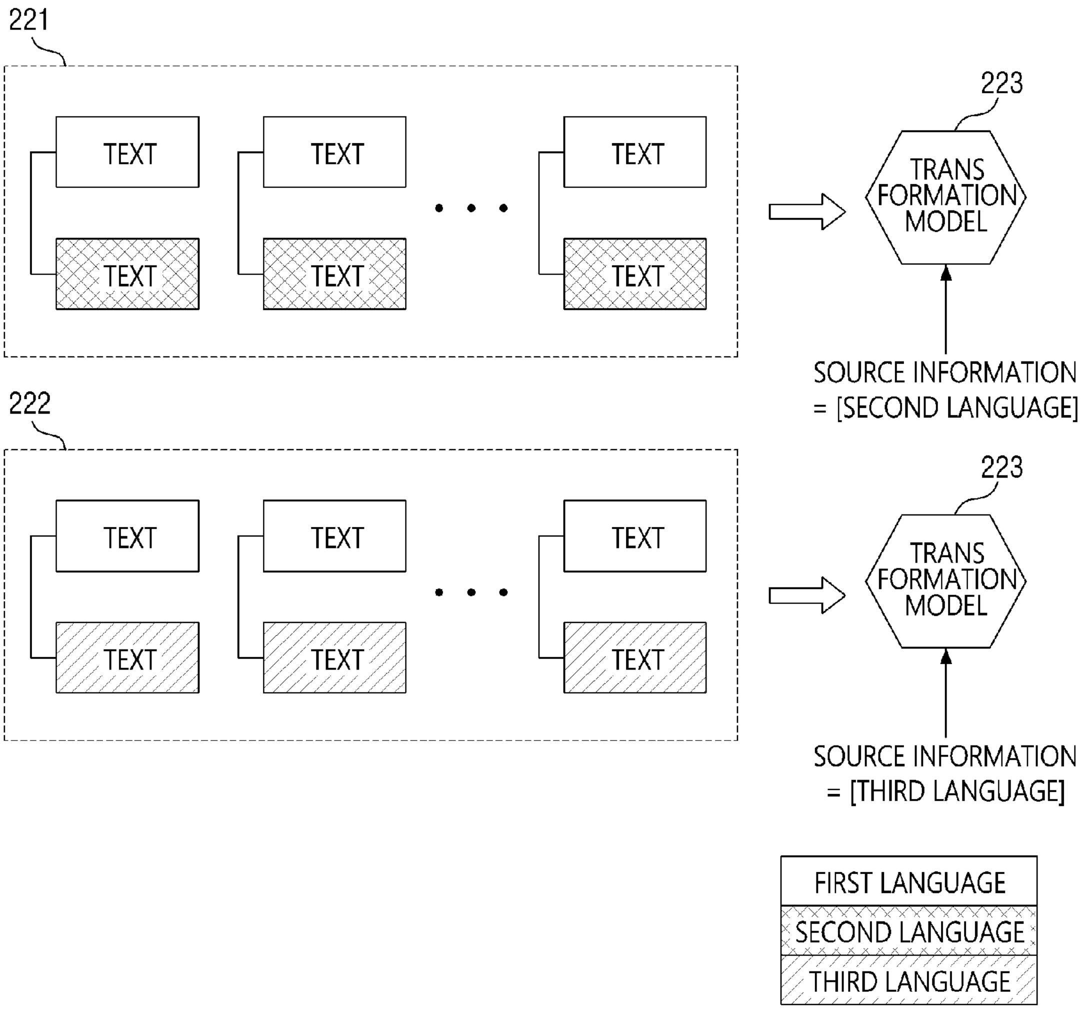
FIGS. 22 and 23 are example diagrams for explaining a one-to-many embedding transformation method according to embodiments of the present disclosure.
Figure 23:
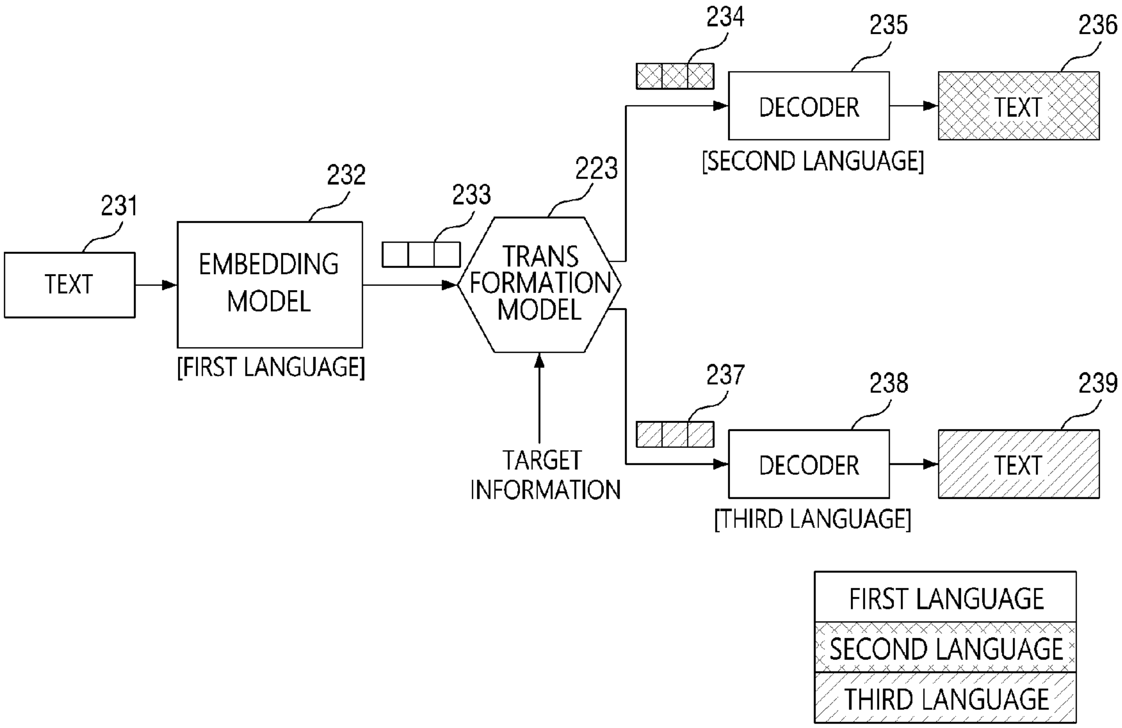

In FIGS. 22 and 23, it is also assumed that the target task is a 'machine translation task'. However, as mentioned above, the following description can be applied to other tasks (e.g., a multimodal task) without a substantial change in technical spirit. In addition, although it is assumed in FIGS. 22 and 23 that the number of languages on the target side is two, the scope of the present disclosure is not limited thereto, and the number of languages on the target side may also be three or more. In addition, FIG. 23 assumes that texts 213, 236 and 239 in different languages correspond to each other.

As illustrated in FIG. 22, the transformation system 10 may train a transformation model 223 using first and second training datasets 221 and 222. Here, the first training dataset 221 may be a training dataset composed of pairs of text in a first language (source side) and text in a second language (target side), and the second training dataset 222 may be a training dataset composed of pairs of text in the first language (source side) and text in a third language (target side).

Specifically, the transformation system 10 may train the transformation model 223 using two training datasets 221 and 222 while explicitly providing target information to the transformation model 223. The target information may be information indicating to which of a plurality of targets an embedding vector input to the transformation model 223 belongs. As illustrated, the transformation system 10 may input target information indicating the second language to the transformation model 223 and train the transformation model 223 using the first training dataset 221. In addition, target information indicating the third language may be input to the transformation model 223, and the transformation model 223 may be trained using the second training dataset 222. In so doing, the transformation model 223 can accurately learn a one-to-many embedding relationship. The method of training the transformation model 223 may be understood from the previous description.

When training is completed, as illustrated in FIG. 23, the transformation system may perform a machine translation task between multiple languages through one transformation model 223. Specifically, the transformation system 10 may translate the text 231 in the first language into the text 236 in the second language through the transformation model 223 and translate the text 231 in the first language into the text 239 in the third language.

In other words, the transformation system 10 may transform the text 231 in the first language into an embedding vector 233 of the first language through an embedding model 232 of the first language (source side). In addition, the transformation system 10 may accurately transform the embedding vector 233 into an embedding vector 234 of a desired target (second language) (i.e., a vector located in an embedding space of the second language) by inputting the embedding vector 233 to the transformation model 223 together with target information indicating the second language. Then, the embedding vector 234 may be decoded into the text 236 in the second language through a decoder 235 of the target.

Similarly, the transformation system 10 may accurately transform the embedding vector 233 into an embedding vector 237 of a desired target (third language) (i.e., a vector located in an embedding space of the third language) by inputting the embedding vector 233 of the first language to the transformation model 223 together with target information indicating the third language. Then, the embedding vector 237 may be decoded into the text 239 in the third language through a decoder 238 of the target.

Until now, the many-to-one embedding transformation method according to the embodiments of the present disclosure has been described with reference to FIGS. 22 and 23. Since many-to-many embedding transformation corresponds to a combination of one-to-many embedding transformation and many-to-one embedding transformation, a description thereof will be omitted.

Until now, the embodiments of the one-to-many, many-to-one, or many-to-many embedding transformation method have been described with reference to FIGS. 19 through 23. According to the above description, a transformation model can be made to accurately learn an embedding relationship (e.g., a one-to-many, many-to-one, or many-to-many embedding relationship) between multiple sources and targets by explicitly providing source information and/or target information to the transformation model. Accordingly, embedding transformation between multiple sources and targets can be performed through one transformation model, and the overall time and computing costs required to build a transformation model can be further reduced. That is, when embedding transformation between multiple sources and targets is required, there is no need to build multiple transformation models (i.e., transformation models that perform one-to-one embedding transformation). Therefore, the cost required to build transformation models is greatly reduced.

Hereinafter, an example computing device 240 that can implement the transformation system 10 according to the embodiments of the present disclosure will be described with reference to FIG. 24.

FIG. 24 illustrates the hardware configuration of a computing device 240.

Referring to FIG. 24, the computing device 240 may include one or more processors 241, a bus 243, a communication interface 244, a memory 242 which loads a computer program executed by the processors 241, and a storage 245 which stores the computer program 246. In FIG. 24, only the components related to the embodiments of the present disclosure are illustrated. Therefore, it will be understood by those of ordinary skill in the art to which the present disclosure pertains that other general-purpose components can be included in addition to the components illustrated in FIG. 24. That is, the computing device 240 may further include various components other than the components illustrated in FIG. 24. In addition, in some cases, some of the components illustrated in FIG. 24 may be omitted from the computing device 240. Each component of the computing device 240 will now be described.

The processors 241 may control the overall operation of each component of the computing device 240. The processors 241 may include at least one of a central processing unit (CPU), a micro-processor unit (MPU), a micro-controller unit (MCU), a graphic processing unit (GPU), and any form of processor well known in the art to which the present disclosure pertains. In addition, the processors 241 may perform an operation on at least one application or program for executing operations/methods according to embodiments of the present disclosure. The computing device 240 may include one or more processors.

Next, the memory 242 may store various data, commands and/or information. The memory 242 may load the program 246 from the storage 245 in order to execute operations/methods according to embodiments of the present disclosure. The memory 242 may be implemented as a volatile memory such as a random access memory (RAM), but the technical scope of the present disclosure is not limited thereto.

Next, the bus 243 may provide a communication function between the components of the computing device 240. The bus 243 may be implemented as various forms of buses such as an address bus, a data bus, and a control bus.

Next, the communication interface 244 may support wired and wireless Internet communication of the computing device 240. In addition, the communication interface 244 may support various communication methods other than Internet communication. To this end, the communication interface 244 may include a communication module well known in the art to which the present disclosure pertains.

Next, the storage 245 may non-temporarily store one or more programs 246. The storage 245 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

Next, the computer program 246 may include one or more instructions for controlling the processors 241 to perform operations/methods according to various embodiments of the present disclosure when the computer program 246 is loaded into the memory 242. That is, the processors 241 may perform the operations/methods according to the various embodiments of the present disclosure by executing the loaded instructions.

For example, the computer program 246 may include instructions for performing an operation of obtaining a source-side embedding model, an operation of transforming source-side data into a first embedding vector through the source-side embedding model, and an operation of transforming the first embedding vector into a second embedding vector located in a target-side embedding space through a transformation model. In this case, the transformation system 10 according to the embodiments of the present disclosure may be implemented through the computing device 240.

Until now, an example computing device 240 that can implement the transformation system 10 according to the embodiments of the present disclosure has been described with reference to FIG. 24.

So far, a variety of embodiments of the present disclosure and the effects according to embodiments thereof have been mentioned with reference to FIGS. 1 to 11. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the example embodiments without substantially departing from the principles of the present disclosure. Therefore, the disclosed example embodiments of the disclosure are used in a generic and descriptive sense only and not for purposes of limitation.

What is claimed is:

1. A method for performing embedding transformation between multiple sources and targets in three or more languages using one transformation model, the method performed by at least one computing device, the method comprising:

obtaining a pair of source-side data and first target-side data, the source-side data being text data in a first language and the first target-side data being text data in a second language;

transforming the source-side data into a first embedding vector located in a source-side embedding space of the first language through a source-side embedding model;

transforming the first embedding vector into a second embedding vector located in a target-side embedding space of the second language through a transformation model;

decoding the second embedding vector through a target-side decoder, wherein the target-side decoder is a neural network configured to decode the second embedding vector into second target-side data in the second language;

training the target-side decoder using a difference between the a result of decoding of the second embedding vector and the first target-side data; and performing a target task using a trained transformation model, the target task comprising a machine translation task, wherein the transformation model comprises an attention layer for the first embedding vector and an implicit layer, wherein the transformation model is configured to receive the first embedding vector as input and output the second embedding vector, and the implicit layer is configured to repeatedly perform a layer operation based on a value of a weight parameter of the implicit layer using an output vector as input until a preset condition is satisfied, wherein the transformation model is trained by using, for each of a combination of multiple sources and targets in three or more languages, a paired dataset comprising pairs of source-side data and target-side data, to learn at least one of a one-to-many, a many-to-one, or a many-to-many embedding relationship between each combination of a source in one of the three or more languages and a target in another one of the three or more languages, and wherein in the transforming the source-side data and the transforming the first embedding vector, source information is provided to the source-side embedding model and/or target information is provided to the transformation model.

2. The method of claim 1, wherein the transformation model is trained using the source-side embedding model and a target-side embedding model, and the source-side embedding model and the target-side embedding model are pre-trained models.

3. The method of claim 1, wherein a training dataset for the transformation model includes source-side training data, target-side training data and target-side type information, and the type information is information for distinguishing a plurality of target-side training data corresponding to the source-side training data.

4. The method of claim 1, further comprising:

transforming the first target-side data into a third embedding vector through a target-side embedding model; and training the transformation model based on a difference between the second embedding vector and the third embedding vector, wherein the first target-side data corresponds to the source-side data.

5. The method of claim 4, wherein the source-side embedding model and the target-side embedding model are pre-trained models, and the training of the transformation model comprises updating a weight parameter of the transformation model in a state where the source-side embedding model and the target-side embedding model are frozen.

6. The method of claim 4, wherein the transformation model is configured to receive the first embedding vector and the third embedding vector and output the second embedding vector.

7. The method of claim 1, further comprising:

training the transformation model based on the difference between the a result of decoding the second embedding vector and the first target-side data, wherein the first target-side data corresponds to the source-side data.

8. The method of claim 1, wherein the target-side decoder is trained through transforming the first target-side data into an embedding vector through a target-side embedding model, decoding the embedding vector through the target-side decoder, and updating a weight parameter of the target-side decoder based on a difference between a result of decoding the embedding vector and the first target-side data.

9. The method of claim 1, wherein the source-side data is text in a source language, the method further comprising translating the text in the source language into text in a target language by decoding the second embedding vector through the target-side decoder.

10. The method of claim 9, wherein the source language comprises the first language and a third language, and the source-side embedding model is configured to transform text in the first language and the third language into an embedding vector located in a shared embedding space.

11. The method of claim 1, wherein the source-side data is data of a source modal, and the second embedding vector is an embedding vector of data of a target modal corresponding to the data of the source modal.

12. The method of claim 1, wherein the source-side embedding model comprises an embedding model of a first source and an embedding model of a second source, the first embedding vector is the source-side data transformed by the embedding model of the first source, and the transforming of the first embedding vector into the second embedding vector comprises obtaining the second embedding vector by inputting the first embedding vector and source information indicating the first source to the transformation model.

13. The method of claim 1, wherein the target-side embedding space comprises an embedding space of a first target and an embedding space of a second target, the second embedding vector is located in the embedding space of the first target, and the transforming of the first embedding vector into the second embedding vector comprises obtaining the second embedding vector by inputting the first embedding vector and target information indicating the first target to the transformation model.

14. A system for performing embedding transformation between multiple sources and targets in three or more languages using one transformation model, the system comprising:

one or more processors; and a memory configured to store one or more instructions, wherein the one or more processors are configured to execute the stored one or more instructions to:

obtain a pair of source-side data and first target-side data, the source-side data being text data in a first language and the first target-side data being text data in a second language, transform the source-side data into a first embedding vector located in a source-side embedding space of the first language through a source-side embedding model, transform the first embedding vector into a second embedding vector located in a target-side embedding space of the second language through a transformation model, decode the second embedding vector through a target-side decoder, wherein the target-side decoder is a neural network configured to decode the second embedding vector into second target-side data in the second language;

train the target-side decoder using a difference between a result of decoding of the second embedding vector and the first target-side data,; and perform a target task using a trained transformation model, the target task comprising machine translation task, wherein the transformation model comprises an attention layer for the first embedding vector and an implicit layer, wherein the transformation model is configured to receive the first embedding vector as input and output the second embedding vector, and the implicit layer is configured to repeatedly perform a layer operation based on a value of a weight parameter of the implicit layer using an output vector as input until a preset condition is satisfied, wherein the transformation model is trained by using, for each of a combination of multiple sources and targets in three or more languages, a paired dataset comprising pairs of source-side data and target-side data, to learn at least one of a one-to-many, a many-to-one, or a many-to-many embedding relationship between each combination of a source in one of the three or more languages and a target in another one of the three or more languages, and wherein in the transforming the source-side data and the transforming the first embedding vector, source information is provided to the source-side embedding model and/or target information is provided to the transformation model.

15. The system of claim 14, wherein the transformation model is trained using the source-side embedding model and a target-side embedding model, and the source-side embedding model and the target-side embedding model are pre-trained models.

16. The system of claim 14, wherein the one or more processors are further configured to transform the first target-side data into a third embedding vector through a target-side embedding model and train the transformation model based on a difference between the second embedding vector and the third embedding vector, wherein the first target-side data corresponds to the source-side data.

17. The system of claim 14, wherein the source-side data is text in a source language, and the one or more processors are further configured to translate the text in the source language into text in a target language by decoding the second embedding vector through the target-side decoder.

18. A non-transitory computer-readable recording medium storing computer program for performing embedding transformation between multiple sources and targets in three or more languages using one transformation model, the computer program being executable by at least one processor to execute:

obtaining a pair of source-side data and first target-side data, the source-side data being text data in a first language and the first target-side data being text data in a second language;

transforming the source-side data into a first embedding vector located in a source-side embedding space of the first language through a source-side embedding model;

transforming the first embedding vector into a second embedding vector located in a target-side embedding space of the second language through a transformation model;

decoding the second embedding vector through a target-side decoder, wherein the target-side decoder is a neural network configured to decode the second embedding vector into second target-side data in the second language; and training the target-side decoder using a difference between a result of decoding of the second embedding vector and the first target-side data; and performing a target task using a trained transformation model, the target task comprising a machine translation task, wherein the transformation model comprises an attention layer for the first embedding vector and an implicit layer, wherein the transformation model is configured to receive the first embedding vector as input and output the second embedding vector, and the implicit layer is configured to repeatedly perform a layer operation based on a value of a weight parameter of the implicit layer using an output vector as input until a preset condition is satisfied, wherein the transformation model is trained by using, for each of a combination of multiple sources and targets in three or more languages, a paired dataset comprising pairs of source-side data and target-side data, to learn at least one of a one-to-many, a many-to-one, or a many-to-many embedding relationship between each combination of a source in one of the three or more languages and a target in another one of the three or more languages, and wherein in the transforming the source-side data and the transforming the first embedding vector, source information is provided to the source-side embedding model and/or target information is provided to the transformation model.

* * * * *